(12) United States Patent
Jin et al.

(10) Patent No.: US 11,799,619 B2
(45) Date of Patent: Oct. 24, 2023

(54) METHOD AND DEVICES FOR COMMUNICATION OF INFORMATION REGARDING A FREQUENCY RESOURCE UNIT

(71) Applicant: Huawei Technologies Co., Ltd., Shenzhen (CN)

(72) Inventors: Le Jin, Shanghai (CN); Jian Wang, Beijing (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 242 days.

(21) Appl. No.: 17/043,868

(22) PCT Filed: Apr. 12, 2019

(86) PCT No.: PCT/CN2019/082378
§ 371 (c)(1),
(2) Date: Sep. 30, 2020

(87) PCT Pub. No.: WO2019/196917
PCT Pub. Date: Oct. 17, 2019

(65) Prior Publication Data
US 2021/0028914 A1     Jan. 28, 2021

(30) Foreign Application Priority Data

Apr. 13, 2018  (CN) .......................... 201810333383.2
Apr. 19, 2018  (CN) .......................... 201810356532.7

(51) Int. Cl.
*H04L 5/00*      (2006.01)
*H04W 8/24*     (2009.01)
(Continued)

(52) U.S. Cl.
CPC ............ *H04L 5/0098* (2013.01); *H04L 5/001* (2013.01); *H04L 5/0053* (2013.01);
(Continued)

(58) Field of Classification Search
CPC ..... H04L 5/0098; H04L 5/0092; H04L 5/001; H04L 5/0053; H04W 8/24; H04W 28/20;
(Continued)

(56) References Cited

U.S. PATENT DOCUMENTS 9,769,831 B2    9/2017  Yu et al.
2008/0045272 A1  2/2008  Wang et al.
(Continued)

FOREIGN PATENT DOCUMENTS

CN   101753658 A   6/2010
CN   103748942 A   4/2014
(Continued)

OTHER PUBLICATIONS

"3rd Generation Partnership Project; Technical Specification Group Radio Access Network; NR; Radio Resource Control (RRC) protocol specification (Release 15)," 3GPP TS 38.331 V15.1.0, Mar. 2018, 268 pages.

(Continued)

*Primary Examiner* — Omar J Ghowrwal
(74) *Attorney, Agent, or Firm* — SLATER MATSIL, LLP

(57) ABSTRACT

A frequency domain resource activation method, a device, and a system, the method including determining, by a terminal, first information, where the first information includes at least one of information used to request that an access network device configure or activate a frequency domain resource unit of the terminal, or first assistance information of a frequency domain resource unit of the terminal, and where the frequency domain resource unit is a bandwidth part (BWP), and sending, by the terminal, the first information to the access network device.

17 Claims, 9 Drawing Sheets

(51) Int. Cl.
*H04W 28/20* (2009.01)
*H04W 8/22* (2009.01)
*H04W 72/0453* (2023.01)
*H04W 72/23* (2023.01)
*H04W 72/20* (2023.01)
*H04W 76/20* (2018.01)

(52) U.S. Cl.
CPC .............. *H04L 5/0092* (2013.01); *H04W 8/22* (2013.01); *H04W 8/24* (2013.01); *H04W 28/20* (2013.01); *H04W 72/0453* (2013.01); *H04W 72/20* (2023.01); *H04W 72/23* (2023.01); *H04W 76/20* (2018.02)

(58) Field of Classification Search
CPC . H04W 72/042; H04W 72/0453; H04W 8/22; H04W 76/20; H04W 72/0406; H04W 72/23; H04W 72/20
See application file for complete search history.

(56) References Cited

U.S. PATENT DOCUMENTS

| | | |
|---|---|---|
| 2014/0269552 A1 | 9/2014 | Saito |
| 2016/0127998 A1 | 5/2016 | Roessel et al. |
| 2018/0020465 A1 | 1/2018 | Chandra et al. |
| 2020/0187259 A1 | 6/2020 | Liu |
| 2020/0336269 A1* | 10/2020 | Shen ................. H04L 5/0012 |

FOREIGN PATENT DOCUMENTS

| | | |
|---|---|---|
| CN | 105704063 A | 6/2016 |
| CN | 105979597 A | 9/2016 |
| CN | 106304351 A | 1/2017 |
| CN | 106572516 A | 4/2017 |
| CN | 106851744 A | 6/2017 |
| CN | 107040952 A | 8/2017 |
| CN | 107222916 A | 9/2017 |
| CN | 107223361 A | 9/2017 |
| EP | 3376812 A1 | 9/2018 |
| WO | 2010101510 A2 | 9/2010 |
| WO | 2015178035 A1 | 11/2015 |
| WO | 2017092707 A1 | 6/2017 |

OTHER PUBLICATIONS

"NR UE Power Saving," Agenda Item: 9.1.2, Source: Apple Inc. Document for: Discussion, Decision, 3GPP TSG-RAN Meeting #97, R1-180459, Chennai, India, Mar. 19-23, 2018, 5 pages.

"UE Overheating for EN-DC," Agenda Item: 10.4.2.3, Source: Apple Inc., Document for Discussion, Decision, 3GPP TSG-RAN WG2 Meeting #101, R2-1802414, Athens, Greece, Feb. 26-Mar. 2, 2018, 3 pages.

"Resource Allocation for D2D Broadcast Communication," Agenda item: 7.2.8.1.3, Source:Samsung, Document for: Discussion and Decision, 3GPP TSG RAN WG1 Meeting #76, R1-140390, Prague, Czech Republic, Feb. 10-14, 2014, 5 pages.

"CORESET Configuration and Search Space Design," Agenda Item: 7.3.1.2, Source: Huawei, HiSilicon, Document for: Discussion and Decision, 3GPP TSG RAN WG1 Meeting #90bis, R1-1717062, Prague, Czech Republic, Oct. 9-13, 2017, 14 pages.

"IDC and Overheating Indication for NSA," Agenda Item: 10.4.2.3, Source: Intel Corporation, Document for: Discussion and Decision, 3GPP TSG-RAN WG2 NR Ad hoc 0118, R2-1800954, Vancouver, Canada, Jan. 22-26, 2018, 2 pages.

* cited by examiner

METHOD AND DEVICES FOR COMMUNICATION OF INFORMATION REGARDING A FREQUENCY RESOURCE UNIT

CROSS REFERENCE TO RELATED APPLICATIONS

This application is a National Stage of International Application No. PCT/CN2019/082378, filed on Apr. 12, 2019, which claims priority to Chinese Patent Application No. 201810356532.7, filed on Apr. 19, 2018 and Chinese Patent Application No. 201810333383.2, filed on Apr. 13, 2018, all of which are hereby incorporated by reference in their entireties.

TECHNICAL FIELD

Embodiments of this application relate to the field of communications technologies, and in particular, to a frequency domain resource activation method, a device, and a system.

BACKGROUND

To adapt to terminals having different bandwidth capabilities, a concept of a bandwidth part (Bandwidth part, BWP) is introduced in a 5th-generation (5th-Generation, 5G) new radio (New Radio, NR) protocol. For example, uplink bandwidth/downlink bandwidth of an entire cell is configured as a plurality of consecutive parts. Configured uplink bandwidth is referred to as an uplink BWP, and configured downlink bandwidth is referred to as a downlink BWP. A terminal may work on an active uplink BWP, and send uplink data on the active uplink BWP; or work on an active downlink BWP, and receive downlink data on the active downlink BWP.

Currently, a BWP is configured or activated for a terminal mainly by a network side device (for example, a base station). That a base station activates a BWP of a terminal is used as an example. The base station proactively sends, to the terminal, activation information that carries information about a to-be-activated BWP. After receiving the activation information, the terminal activates the BWP based on the information that is about the to-be-activated BWP and that is carried in the activation information, and works on the active BWP. In other words, the BWP used by the terminal is totally determined by the network side device.

With development of the 5G NR protocol, in a new 5G NR protocol, a base station can schedule a plurality of active BWPs for a terminal, so that the terminal simultaneously works on the plurality of BWPs. When the terminal simultaneously works on the plurality of active BWPs, the terminal can obtain larger bandwidth, and a peak rate of the terminal can be increased. However, activating the plurality of BWPs by the base station is likely to cause a series of problems such as excessively high power consumption and/or overheating of the terminal, and therefore does not meet a communication requirement of the terminal.

SUMMARY

Embodiments of this application provide a frequency domain resource activation method, a device, and a system, to resolve a problem that an existing BWP activation method does not meet a communication requirement of a terminal.

To achieve the foregoing objective, the following technical solutions are used in the embodiments of this application.

According to a first aspect, an embodiment of this application provides a frequency domain resource activation method. A terminal determines first information, and sends the first information to an access network device, where the first information includes information used to request the access network device to configure or activate a frequency domain resource unit of the terminal, or includes first assistance information of a frequency domain resource unit of the terminal. Based on the method provided in this embodiment, the terminal proactively sends, to the access network device, the information used to request to configure or activate the frequency domain resource unit of the terminal, or proactively sends, to the access network device, the first assistance information including the frequency domain resource unit of the terminal, so that the access network device configures or activates the frequency domain resource unit after receiving the information sent by the terminal. In other words, when configuring or activating the frequency domain resource unit, the access network device needs to perform configuration or activation with reference to the information sent by the terminal, instead of using a prior-art solution in which an access network device autonomously configures or activates frequency domain resource bandwidth (for example, a BWP). This can avoid a problem that a communication requirement of the terminal cannot be met due to a frequency domain resource unit autonomously configured or activated by the access network device.

A design may be that, with reference to the first aspect, the method further includes: detecting, by the terminal, that a battery level of the terminal is greater than a preset battery level threshold or a temperature of the terminal is less than a preset temperature threshold, and sending second information to the access network device, where the second information includes information used to request the access network device to configure or activate the frequency domain resource unit based on capability information of the terminal, or includes second assistance information of the terminal. In this way, when the battery level of the terminal recovers, or an overheating status of the terminal is alleviated, the terminal reports signaling to remove a limitation that the access network device needs to configure or activate the frequency domain resource unit based on the information reported by the terminal, so that the access network device autonomously selects, based on the capability information of the terminal, bandwidth of the to-be-configured or to-be-activated frequency domain resource unit and a quantity of to-be-configured or to-be-activated frequency domain resource units.

According to a second aspect, an embodiment of this application provides a frequency domain resource activation method. An access network device receives first information that is sent by a terminal and that includes information used to request the access network device to configure or activate a frequency domain resource unit of the terminal or includes first assistance information of a frequency domain resource unit of the terminal, and configures or activates the frequency domain resource unit based on the first information. Based on the method provided in this embodiment, the access network device configures or activates the frequency domain resource unit after receiving the information sent by the terminal. In other words, when configuring or activating the frequency domain resource unit, the access network device needs to perform configuration or activation with reference to the information sent by the terminal, instead of using a prior-art solution in which an access network device autonomously configures or activates frequency domain resource bandwidth (for example, a BWP). This can avoid a problem that a communication requirement of the terminal cannot be met due to a frequency domain resource unit autonomously configured or activated by the access network device.

A design may be that, with reference to the second aspect, the method further includes: receiving, by the access network device, second information that is sent by the terminal and that includes information used to request the access network device to configure or activate the frequency domain resource unit based on capability information of the terminal or includes second assistance information of the terminal. In this way, when a battery level of the terminal recovers, or an overheating status of the terminal is alleviated, the terminal reports signaling to remove a limitation that the access network device needs to configure or activate the frequency domain resource unit based on the information reported by the terminal, so that the access network device autonomously selects, based on the capability information of the terminal, bandwidth of the to-be-configured or to-be-activated frequency domain resource unit and a quantity of to-be-configured or to-be-activated frequency domain resource units.

According to a third aspect, an embodiment of this application provides a terminal. The terminal includes a determining unit and a sending unit.

The determining unit is configured to determine first information that includes information used to request an access network device to configure or activate a frequency domain resource unit of the terminal or includes first assistance information of a frequency domain resource unit of the terminal. The sending unit is configured to send, to the access network device, the first information determined by the determining unit.

The terminal provided in the third aspect may perform the method in the first aspect. Therefore, for a technical effect brought by the third aspect, refer to the technical effect brought by the first aspect. Details are not described again.

A design may be that, with reference to the third aspect, the terminal further includes a detection unit. The detection unit is configured to detect that a battery level of the terminal is greater than a preset battery level threshold or a temperature of the terminal is less than a preset temperature threshold. The sending unit is further configured to send, to the access network device, second information that includes information used to request the access network device to configure or activate the frequency domain resource unit based on capability information of the terminal or includes second assistance information of the terminal. In this way, when the battery level of the terminal recovers, or an overheating status of the terminal is alleviated, the terminal reports signaling to remove a limitation that the access network device needs to configure or activate the frequency domain resource unit based on the information reported by the terminal, so that the access network device autonomously selects, based on the capability information of the terminal, bandwidth of the to-be-configured or to-be-activated frequency domain resource unit and a quantity of to-be-configured or to-be-activated frequency domain resource units.

According to a fourth aspect, an embodiment of this application provides an access network device. The access network device includes a receiving unit and a configuration or activation unit.

The receiving unit is configured to receive first information that is sent by a terminal and that includes information used to request the access network device to configure or activate a frequency domain resource unit of the terminal or includes first assistance information of a frequency domain resource unit of the terminal. The configuration or activation unit is configured to configure or activate the frequency domain resource unit based on the first information received by the receiving unit.

The access network device provided in the fourth aspect may perform the method in the second aspect. Therefore, for a technical effect brought by the fourth aspect, refer to the technical effect brought by the first aspect. Details are not described again.

A design may be that, with reference to the fourth aspect, the receiving unit is further configured to receive second information that is sent by the terminal and that includes information used to request the access network device to configure or activate the frequency domain resource unit based on capability information of the terminal or includes second assistance information of the terminal. In this way, when a battery level of the terminal recovers, or an overheating status of the terminal is alleviated, the terminal reports signaling to remove a limitation that the access network device needs to configure or activate the frequency domain resource unit based on the information reported by the terminal, so that the access network device autonomously selects, based on the capability information of the terminal, bandwidth of the to-be-configured or to-be-activated frequency domain resource unit and a quantity of to-be-configured or to-be-activated frequency domain resource units.

According to a fifth aspect, an embodiment of this application provides a terminal. The terminal includes a processor, a communications interface, and a memory. These components are connected by using a communications bus. The memory is configured to store a computer executable instruction. When the terminal runs, the processor executes the computer executable instruction stored in the memory, so that the terminal performs the frequency domain resource activation method according to the first aspect.

For example, the processor is configured to: determine first information that includes information used to request an access network device to configure or activate a frequency domain resource unit of the terminal or includes first assistance information of a frequency domain resource unit of the terminal; and send, to the access network device through the communications interface, the first information determined by the processor.

The terminal provided in the fifth aspect may perform the method in the first aspect. Therefore, for a technical effect brought by the fifth aspect, refer to the technical effect brought by the first aspect. Details are not described again.

A design may be that, with reference to the fifth aspect, the processor is further configured to detect that a battery level of the terminal is greater than a preset battery level threshold or a temperature of the terminal is less than a preset temperature threshold; and the communications interface is further configured to send, to the access network device, information that includes information used to request the access network device to configure or activate the frequency domain resource unit based on capability information of the terminal or includes second assistance information of the terminal. In this way, when the battery level of the terminal recovers, or an overheating status of the terminal is alleviated, the terminal reports signaling to remove a limitation that the access network device needs to configure or activate the frequency domain resource unit based on the information reported by the terminal, so that the access network device autonomously selects, based on the capability information of the terminal, bandwidth of the to-be-configured or to-be-activated frequency domain resource unit and a quantity of to-be-configured or to-be-activated frequency domain resource units.

According to a sixth aspect, an embodiment of this application provides an access network device. The access network device includes a processor, a communications interface, and a memory. These components are connected by using a communications bus. The memory is configured to store a computer executable instruction. When the access network device runs, the processor executes the computer executable instruction stored in the memory, so that the access network device performs the frequency domain resource activation method according to the first aspect.

For example, the processor is configured to receive, through the communications interface, first information that is sent by a terminal and that includes information used to request the access network device to configure or activate a frequency domain resource unit of the terminal or includes first assistance information of a frequency domain resource unit of the terminal; and configure or activate the frequency domain resource unit based on the first information received through the communications interface.

The access network device provided in the sixth aspect may perform the method in the second aspect. Therefore, for a technical effect brought by the sixth aspect, refer to the technical effect brought by the first aspect. Details are not described again.

A design may be that, with reference to the sixth aspect, the communications interface is further configured to receive second information that is sent by the terminal and that includes information used to request the access network device to configure or activate the frequency domain resource unit based on capability information of the terminal or includes second assistance information of the terminal. In this way, when a battery level of the terminal recovers, or an overheating status of the terminal is alleviated, the terminal reports signaling to remove a limitation that the access network device needs to configure or activate the frequency domain resource unit based on the information reported by the terminal, so that the access network device autonomously selects, based on the capability information of the terminal, bandwidth of the to-be-configured or to-be-activated frequency domain resource unit and a quantity of to-be-configured or to-be-activated frequency domain resource units.

A design may be that, with reference to any one of the first aspect to the sixth aspect or the embodiments of any aspect, the first assistance information is used to indicate the access network device to configure or activate the frequency domain resource unit of the terminal; the first information is determined based on a first state of the terminal; and the first state is that the battery level is less than or equal to the preset battery level threshold and/or the temperature of the terminal is greater than or equal to the preset temperature threshold, or may be another state of the terminal. This is not limited. In this way, when the terminal has low battery and/or is overheated, the terminal can request the access network device to configure or activate the frequency domain resource unit, so that the frequency domain resource unit configured or activated by the access network device meets a current working status of the terminal, to alleviate a current status of low battery or overheating of the terminal.

A second design may be that, with reference to any one of the first aspect to the sixth aspect, the embodiments of any aspect, or the first embodiment, the first assistance information includes or indicates at least one of the following pieces of information: a bandwidth or maximum bandwidth that is of a frequency domain resource unit and that is preferred by the terminal, a quantity or maximum quantity that is of frequency domain resource units and that is preferred by the terminal, and a total bandwidth or maximum total bandwidth that is of frequency domain resource units and that is preferred by the terminal. In this way, the terminal can notify the access network device of bandwidth information and/or quantity information that are/is of a frequency domain resource unit and that are/is preferred by the terminal, so that the network side device configures or activates the frequency domain resource unit based on the frequency domain resource unit information preferred by the terminal. For example, a bandwidth of an active frequency domain resource unit may be reduced, and a quantity of simultaneously activated frequency domain resource units may be reduced, so as to reduce power consumption of the terminal and reduce heating.

A third design may be that, with reference to any one of the first aspect to the sixth aspect, the embodiments of any aspect, or the first embodiment, the first assistance information includes or indicates indication information of a frequency domain resource unit preferred by the terminal, and the indication information is used to indicate the frequency domain resource unit that the terminal expects to activate. In this way, the terminal can provide the preferred frequency domain resource unit to the access network device, so that the network side device activates the frequency domain resource unit within an expectation of the terminal, for example, configures or activates a small-bandwidth frequency domain resource unit in the preferred frequency domain resource unit, to reduce a quantity of simultaneously activated frequency domain resource units, thereby reducing power consumption of the terminal and reducing heating.

A fourth design may be that, with reference to any one of the first aspect to the sixth aspect, the embodiments of any aspect, or the first embodiment, the first assistance information includes or indicates a quantity or maximum quantity that is of blind decoding times of a physical downlink control channel (Physical Downlink Control Channel, PDCCH) and that is preferred by the terminal. In this way, the terminal can limit a quantity of blind decoding times of a PDCCH, to reduce a quantity of times of blind decoding performed by the terminal on a PDCCH, so that the terminal reduces power consumption caused by PDCCH blind decoding.

A fifth design may be that, with reference to any one of the first aspect to the sixth aspect or any one of the foregoing embodiments, the first assistance information includes or indicates working status information of the terminal. In other words, the first assistance information indicates a working status of the terminal. The working status information of the terminal includes at least one of the following pieces of information: battery level information of the terminal and temperature information of the terminal. The working status of the terminal is a current battery level status or a current temperature status (for example, low battery or excessively high temperature) of the terminal. Based on this embodiment, the terminal directly reports the working status information of the terminal to the access network device, so that the access network device configures or activates the frequency domain resource unit based on an indication of the working status information, and the terminal does not need to perform additional processing. Implementation is simple.

A sixth design may be that, with reference to any one of the first aspect to the sixth aspect or any one of the foregoing embodiments, the second assistance information is used to indicate the access network device to configure or activate the frequency domain resource unit based on the capability information of the terminal. In this way, the access network device can configure or activate the frequency domain resource unit based on the capability information of the terminal according to the indication of the second assistance information.

A seventh design may be that, with reference to any one of the first aspect to the sixth aspect or any one of the foregoing embodiments, the second assistance information includes the current working status information of the terminal, or indicates the working status of the terminal, so that the access network device configures or activates the frequency domain resource unit based on the current working status of the terminal (for example, both the battery level and the temperature of the terminal are normal) and the capability information of the terminal.

An eighth design may be that with reference to any one of the first aspect to the sixth aspect or any one of the foregoing embodiments, the frequency domain resource unit belongs to one carrier, or the frequency domain resource unit belongs to one cell.

A ninth design may be that, with reference to any one of the first aspect to the sixth aspect or any one of the foregoing embodiments, the frequency domain resource unit is a BWP.

According to a seventh aspect, a computer readable storage medium is provided. The computer readable storage medium stores an instruction. When the instruction is run on a computer, the computer is enabled to perform the frequency domain resource activation method according to any one of the first aspect or the embodiments.

According to an eighth aspect, a computer program product including an instruction is provided. When the computer program product is run on a computer, the computer is enabled to perform the frequency domain resource activation method according to any one of the first aspect or the embodiments.

According to a ninth aspect, a chip system is provided. The chip system includes a processor and a communications interface, for supporting a terminal in implementing functions in the foregoing aspects. For example, the processor is supported in determining first information that includes information used to request an access network device to configure or activate a frequency domain resource unit of the terminal or includes first assistance information of a frequency domain resource unit of the terminal, and sending, to the access network device through the communications interface, the first information determined by the processor. In an embodiment, the chip system further includes a memory, and the memory is configured to store a program instruction and data that are necessary for the terminal. The chip system may include a chip, or may include a chip and another discrete device.

For a technical effect brought by any design manner in the seventh aspect to the ninth aspect, refer to the technical effect brought by any one of the third aspect, the fifth aspect, or the foregoing embodiments. Details are not described again.

According to a tenth aspect, a computer readable storage medium is provided. The computer readable storage medium stores an instruction. When the instruction is run on a computer, the computer is enabled to perform the frequency domain resource activation method according to any one of the second aspect or the embodiments.

According to an eleventh aspect, a computer program product including an instruction is provided. When the computer program product is run on a computer, the computer is enabled to perform the frequency domain resource activation method according to any one of the second aspect or the embodiments.

According to a twelfth aspect, a chip system is provided. The chip system includes a processor and a communications interface, for supporting an access network device in implementing functions in the foregoing aspects. For example, the processor is supported in receiving, through the communications interface, first information that is sent by a terminal and that includes information used to request the access network device to configure or activate a frequency domain resource unit of the terminal or includes first assistance information of a frequency domain resource unit of the terminal, and configuring or activating the frequency domain resource unit based on the first information received through the communications interface. In a embodiment, the chip system further includes a memory, and the memory is configured to store a program instruction and data that are necessary for the access network device. The chip system may include a chip, or may include a chip and another discrete device.

For a technical effect brought by any design manner in the tenth aspect to the twelfth aspect, refer to the technical effect brought by any one of the fourth aspect, the sixth aspect, or the foregoing embodiments. Details are not described again.

According to a thirteenth aspect, an embodiment of this application provides a resource unit activation system, including the terminal according to any one of the third aspect, the fifth aspect, or the seventh aspect to the ninth aspect, and the access network device according to any one of the fourth aspect, the sixth aspect, or the tenth aspect to the twelfth aspect.

DETAILED DESCRIPTION OF ILLUSTRATIVE EMBODIMENTS

The following describes implementations of embodiments of this application in detail with reference to accompanying drawings.

Figure 1:
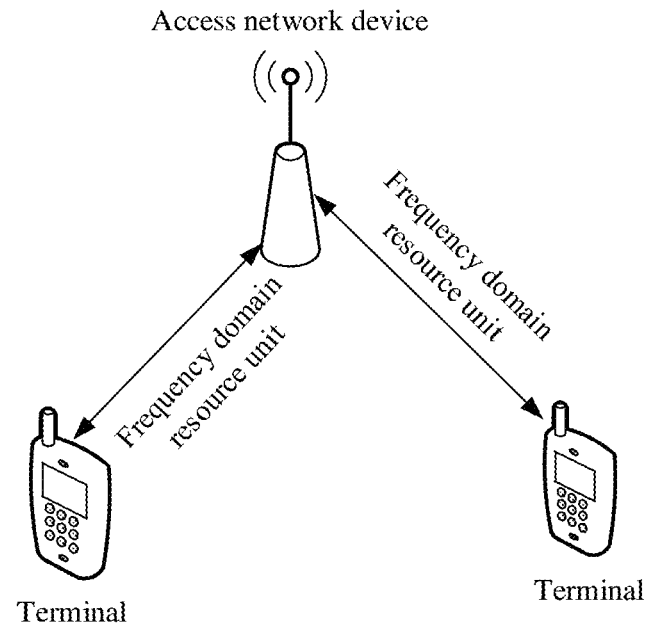
FIG. 1 is a simplified schematic diagram of a system architecture according to an embodiment of this application.

A frequency domain resource activation method provided in the embodiments of this application may be applied to a communications system shown in FIG. 1. The communications system may be a 5G mobile communications system, may be a long term evolution (Long Term Evolution, LTE) system, or may be another actual mobile communications system. This is not limited.

As shown in FIG. 1, the communications system may include an access network device and a plurality of terminals. The terminal may simultaneously work on a plurality of frequency domain resource units, and communicate with the access network device by using the plurality of frequency domain resource units. In the embodiments of this application, the frequency domain resource unit may be a BWP, and the frequency domain resource unit belongs to one carrier (Carrier, CC), or belongs to one cell. Usually, frequency domain resource units may be classified into an uplink frequency domain resource unit and a downlink frequency domain resource unit based on transmission directions of data carried on the frequency domain resource units. For example, if a frequency domain resource unit is used for transmitting data from a terminal to an access network device, the frequency domain resource unit is an uplink frequency domain resource unit; if a frequency domain resource unit is used for transmitting data from an access network device to a terminal, the frequency domain resource unit is a downlink frequency domain resource unit. In a time division duplex (Time Division Duplexing, TDD) mode, an uplink frequency domain resource unit and a downlink frequency domain resource unit are in a pair, and the uplink frequency domain resource unit and the downlink frequency domain resource unit are at a same location. In this case, the uplink frequency domain resource unit and the downlink frequency domain resource unit that are at the same location in the TDD mode may be referred to as an uplink and downlink frequency domain resource unit, that is, may be understood as one frequency domain resource unit. In the embodiments of this application, for ease of description, an uplink frequency domain resource unit, a downlink frequency domain resource unit, and an uplink and downlink frequency domain resource unit are collectively referred to as frequency domain resource units.

It should be noted that FIG. 1 is merely an example framework diagram. A quantity of nodes included in FIG. 1 is not limited. In addition to the function nodes shown in FIG. 1, another node, for example, a core network device, a gateway device, or an application server, may be further included. This is not limited.

The terminal in FIG. 1 may be configured to connect to the access network device through a wireless air interface, and then access a data network. The terminal may be user equipment (User Equipment, UE), for example, a mobile phone or a computer, or may be a cellular phone, a cordless phone, a session initiation protocol (Session Initiation Protocol, SIP) phone, a smartphone, a wireless local loop (Wireless Local Loop, WLL) station, a personal digital assistant (Personal Digital Assistant, PDA), a computer, a laptop computer, a handheld communications device, a handheld computing device, a satellite wireless device, a wireless modem card, a television set-top box (Set Top Box, STB), a customer-premises equipment (Customer Premise Equipment, CPE), and/or another device configured to perform communication in a wireless system.

The access network device in FIG. 1 is mainly configured to implement functions such as a radio physical control function, resource scheduling, radio resource management, radio access control, and mobility management, and may be an access network (Access Network, AN)/radio access network (Radio Access Network, RAN) device, a network including a plurality of 5G-AN/5G-RAN nodes, a NodeB (NodeB, NB), or an evolved NodeB (Evolution NodeB, eNB). The 5G-AN/5G-RAN node may be an access node, a next generation base station (Generation NodeB, gNB), a transmission reception point (Transmission Receive Point, TRP), a transmission point (Transmission Point, TP), or another access node.

Figure 2:
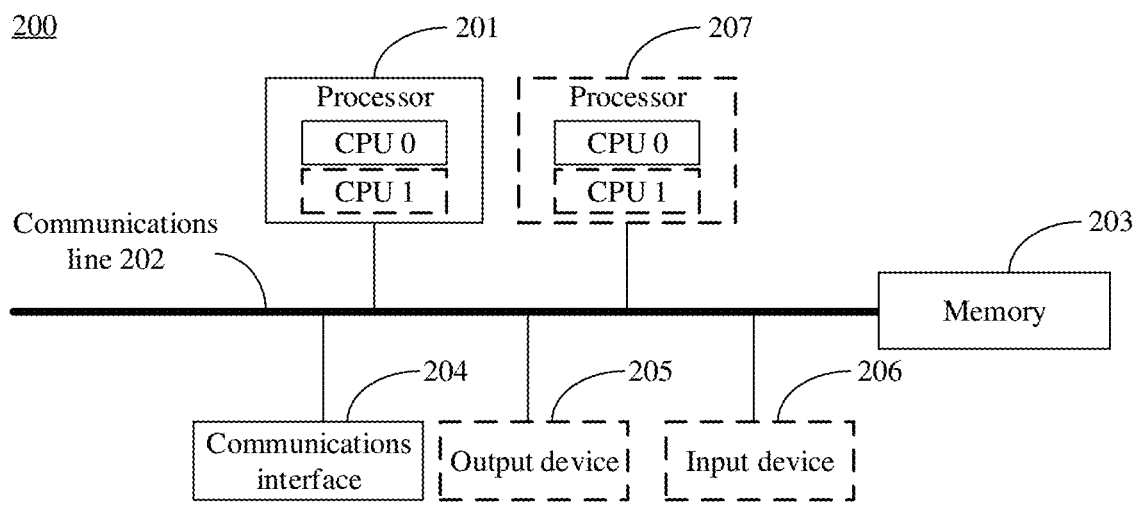
FIG. 2 is a schematic composition diagram of a communications device according to an embodiment of this application.

Specifically, to implement the frequency domain resource activation method provided in the embodiments of this application, the access network device and the terminal in FIG. 1 may include components shown in FIG. 2. FIG. 2 is a schematic composition diagram of a communications device according to an embodiment of this application. As shown in FIG. 2, the communications device 200 includes at least one processor 201, a communications line 202, a memory 203, and at least one communications interface 204. The processor 201, the memory 203, and the communications interface 204 may be connected to each other by using the communications line 202.

The processor 201 may be a central processing unit (Central Processing Unit, CPU), or may be an application-specific integrated circuit (Application Specific Integrated Circuit, ASIC), or may be configured as one or more integrated circuits implementing this embodiment of this application, for example, one or more digital signal processors (Digital Signal Processor, DSP) or one or more field programmable gate arrays (Field Programmable Gate Array, FPGA).

The communications line 202 may include a path for transferring information between the foregoing components.

The communications interface 204 is configured to communicate with another device or a communications network, and may use any apparatus of a transceiver type, for example, an Ethernet, a radio access network (Radio Access Network, RAN), or a wireless local area network (Wireless Local Area Networks, WLAN).

The memory 203 may be a read-only memory (Read-Only Memory, ROM), another type of static storage device that can store static information and an instruction, a random access memory (Random Access Memory, RAM), or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 203 is not limited thereto. The memory 203 may exist independently, and be connected to the processor 201 by using the communications line 202. Alternatively, the memory 203 may be integrated with the processor 201. The memory 203 is configured to store an execution instruction or application program code, and the processor 201 controls execution, to implement frequency domain resource activation methods provided in the following embodiments of this application, for example, implement the methods shown in FIG. 3 to FIG. 13.

In an implementable manner, the processor 201 may include one or more CPUs, for example, a CPU 0 and a CPU 1 in FIG. 2. In another implementable manner, the communications device 200 may include a plurality of processors, for example, a processor 201 and a processor 207 in FIG. 2. In still another implementable manner, the communications device 200 may further include an output device 205 and an input device 206.

When the communications device 200 is the terminal shown in FIG. 1, the communications device 200 may further include a temperature sensor, a battery control module, and the like. The temperature sensor and a battery controller may be connected to the processor 201 by using the communications bus 202. The temperature sensor may be configured to detect a temperature of the communications device 200 in real time, and transmit the detected temperature to the processor 201. The battery controller may be configured to detect a battery level of the communications device 200 in real time, and transmit the detected battery level to the processor 201.

It should be noted that the communications device 200 may be a general-purpose device or a dedicated device. For example, the communications device 200 may be a desktop computer, a portable computer, a network server, a PDA, a mobile phone, a tablet computer, a wireless terminal, an embedded device, or a device having a structure similar to that in FIG. 2. A type of the communications device 200 is not limited in this embodiment of this application.

The following describes, with reference to the communications system shown in FIG. 1, the frequency domain resource activation method provided in the embodiments of this application. In an implementable manner, a terminal in the following embodiments is any terminal in FIG. 1, and an access network device in the following embodiments is the access network device in FIG. 1.

Figure 3:
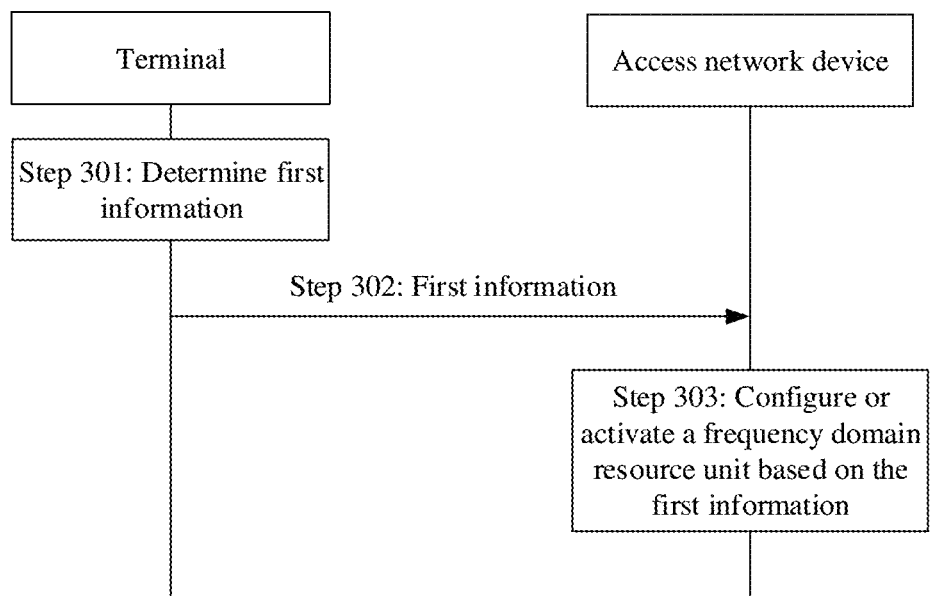
FIG. 3 is a flowchart of a frequency domain resource activation method according to an embodiment of this application.

FIG. 3 is a flowchart of a frequency domain resource activation method according to an embodiment of this application. The method is performed by a terminal and an access network device through interaction, and is used to configure or activate a frequency domain resource unit of the terminal. As shown in FIG. 3, the method may include the following steps.

Step 301: The terminal determines first information.

The first information may include information used to request the access network device to configure or activate the frequency domain resource unit of the terminal. For example, the first information may be a configuration or activation request, and the configuration or activation request includes the information used to request the access network device to configure or activate the frequency domain resource unit of the terminal.

Alternatively, the first information may include first assistance information, and the first assistance information is used to indicate the access network device to configure or activate the frequency domain resource unit of the terminal. After receiving the first information, the access network device may configure or activate the frequency domain resource unit of the terminal based on the first assistance information included in the first information. It should be noted that, in this application, the first assistance information is information used to indicate the access network device to configure or activate the frequency domain resource unit of the terminal. The information may have another name besides the name "first assistance information". For example, different expressions such as activation assistance information may also be included in the idea scope of this application.

In all the embodiments of this application, the frequency domain resource unit of the terminal activated by the access network device may be included in a plurality of frequency domain resource units preconfigured by the access network device for the terminal. For example, after the terminal goes online, the access network device may preconfigure four frequency domain resource units. The four frequency domain resource units may be in an inactive state when the terminal is not used. When the terminal needs to communicate with the access network device by using a frequency domain resource unit or adjust an active frequency domain resource unit based on a working status of the terminal, the terminal may request the access network device to activate one or more of the four frequency domain resource units.

The first assistance information may be determined based on a first state of the terminal. The first state of the terminal may be one or more of the following: A battery level is less than or equal to a preset battery level threshold, a temperature of the terminal is greater than or equal to a preset temperature threshold, and a signal strength of the terminal is less than or equal to a preset signal strength. The preset battery level threshold, the preset temperature threshold, and the preset signal strength may be set depending on a requirement, and are not limited. When the battery level of the terminal is less than or equal to the preset battery level threshold, it indicates that the battery level of the terminal is comparatively low. When the temperature of the terminal is greater than or equal to the preset temperature threshold, it indicates that the terminal is overheated. When the signal strength of the terminal is less than or equal to the preset signal strength, it indicates that a signal of the terminal is comparatively poor.

The first assistance information may include or indicate at least one of the following pieces of information: a bandwidth (or maximum bandwidth) that is of a frequency domain resource unit and that is preferred (preferred) by the terminal, a quantity (or maximum quantity) that is of frequency domain resource units and that is preferred by the terminal, or a total bandwidth (or maximum total bandwidth) that is of frequency domain resource units and that is preferred by the terminal. The first assistance information may further include or indicate indication information of a frequency domain resource unit preferred by the terminal. The first assistance information may also include or indicate a quantity or maximum quantity that is of blind decoding times of a PDCCH and that is preferred by the terminal, or the like. The first assistance information may also include or indicate working status information of the terminal, in other words, the first assistance information indicates a working status of the terminal. Specifically, for related descriptions of the first assistance information, refer to descriptions of FIG. 4 to FIG. 13.

Step 302: The terminal sends the first information to the access network device, and the access network device receives the first information.

In an embodiment, when detecting that the terminal is in the first state, a processor of the terminal proactively triggers the terminal to add the first information to air interface signaling and send the air interface signaling to the access network device. A user is unaware of the sending process.

In another embodiment, when detecting that the terminal is in the first state, the terminal sends status information and prompt information to the user by using a user interface (User Interface, UI). The user may send a confirmation instruction to the terminal with reference to the status information and the prompt information. According to the confirmation instruction sent by the user, the terminal adds the first information to air interface signaling and sends the air interface signaling to the access network device. In other words, the terminal sends the first information to the access network device only after receiving the instruction of the user. This improves user experience.

The status information is used to indicate that the terminal is in the first state, and may be represented in a form of an icon, a text, or the like. The prompt information may be information such as whether to switch a working mode of the terminal because the terminal is currently in the first state. The working mode of the terminal corresponds to a quantity and size of simultaneously activated frequency domain resource units of the terminal. Usually, the terminal may have two working modes. One working mode corresponds to a comparatively large quantity and comparatively large bandwidth of simultaneously activated frequency domain resource units, and the other working mode corresponds to a comparatively small quantity and comparatively small bandwidth of simultaneously activated frequency domain resource units.

Figure 3A:
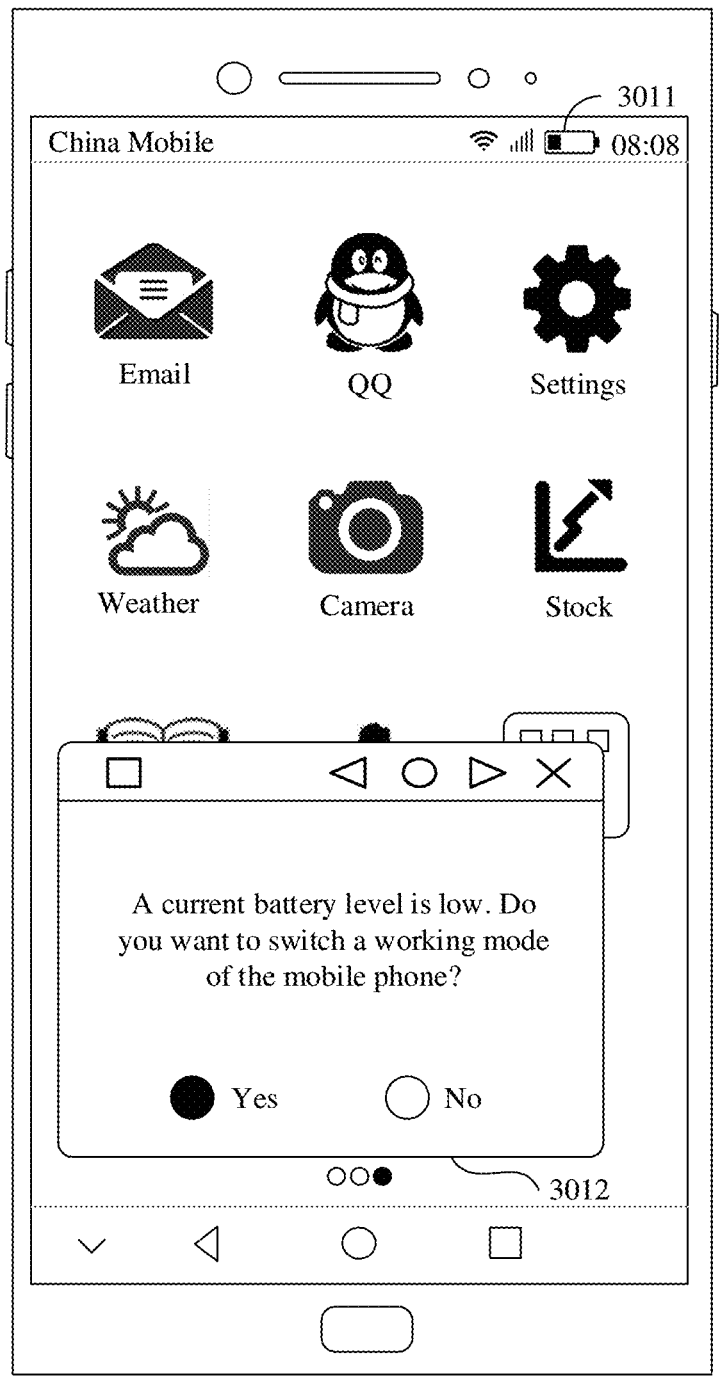
FIG. 3a is a schematic diagram of human-computer interaction according to an embodiment of this application.

As shown in FIG. 3a, it is assumed that the terminal is a mobile phone, and the first state of the terminal is that the battery level of the terminal is comparatively low. In this case, when detecting that the battery level of the mobile phone is comparatively low, a processor of the mobile phone continuously blinks a battery icon (as shown by 3011 in FIG. 3a) on a display screen, or displays a battery icon in red to notify the user that the current battery level of the mobile phone is comparatively low; at the same time, a prompt box (as shown by 3012 in FIG. 3a) pops up on the display screen to prompt the user whether to switch a working module of the mobile phone because the battery level of the mobile phone is comparatively low. If the user taps a button "Yes" in the prompt box, the processor of the mobile phone determines to switch the working mode of the mobile phone, and performs the process in step 301.

Step 303: The access network device configures or activates the frequency domain resource unit based on the first information.

Specifically, that the access network device configures or activates the frequency domain resource unit based on the first information may include the following:

The access network device configures or activates the frequency domain resource unit of the terminal based on the first assistance information, where the first information includes the first assistance information. For different first assistance information, the access network device uses different selection criteria when configuring or activating the frequency domain resource unit. For details, refer to solutions in FIG. 4 to FIG. 13.

That the access network device activates the frequency domain resource unit of the terminal is used as an example. Further, after step 303, the method may further include: sending, by the access network device, activation information to the terminal, where the activation information may be used to indicate at least one to-be-activated frequency domain resource unit, and the activation information may include an identifier of the at least one frequency domain resource unit. The identifier of the frequency domain resource unit is used to identify the frequency domain resource unit. The identifier of the frequency domain resource unit may be a code of the frequency domain resource unit, an index number of the frequency domain resource unit, or the like. This is not limited.

The activation information may be carried in radio resource control (Radio Resource Control, RRC) signaling or downlink control information (Downlink Control Information, DCI) to be delivered to the terminal. When the activation information is carried in the RRC signaling and delivered to the terminal, the terminal may further send an RRC configuration response to the access network device after activating the frequency domain resource unit based on the activation information, so as to indicate that the terminal successfully activates the frequency domain resource unit.

Further, the method shown in FIG. 3 may further include:
detecting, by the terminal, that the battery level of the terminal is greater than the preset battery level threshold and the temperature of the terminal is less than the preset temperature threshold; and sending, by the terminal, second information to the access network device, where the second information includes information used to indicate the access network device to activate the frequency domain resource unit based on capability information of the terminal, or includes second assistance information of the terminal.

The second assistance information is used to indicate the access network device to configure or activate the frequency domain resource unit based on the capability information of the terminal. Specifically, the second assistance information may include the current working status information (such as battery level information and temperature information) of the terminal, or indicate the working status of the terminal (for example, the battery level is normal or the temperature is normal).

The capability information of the terminal is used to indicate a communication capability of the terminal, which may be a communication capability configured before delivery of the terminal. The communication capability may be specifically a baseband processing capability, a radio frequency capability, or the like.

In this way, when the battery level of the terminal recovers, or an overheating status of the terminal is alleviated, the terminal reports signaling to remove a limitation that the access network device needs to configure or activate the frequency domain resource unit based on the information reported by the terminal, so that the access network device autonomously selects, based on the capability information of the terminal, bandwidth of the to-be-configured or to-be-activated frequency domain resource unit and a quantity of to-be-configured or to-be-activated frequency domain resource units.

It should be noted that the terminal does not send the first information and the second information at the same time. The access network device performs processing based on whether the first information or the second information is currently received.

Based on the method shown in FIG. 3, the terminal proactively sends, to the access network device, the first information that includes the information used to request to configure or activate the frequency domain resource unit of the terminal or includes the first assistance information of the frequency domain resource unit of the terminal, so that the access network device configures or activates the frequency domain resource unit based on the first information after receiving the first information sent by the terminal. In other words, when configuring or activating the frequency domain resource unit, the access network device needs to perform configuration or activation with reference to the information sent by the terminal, instead of using a prior-art solution in which an access network device autonomously configures or activates frequency domain resource bandwidth of a terminal. This can avoid a problem that a communication requirement of the terminal cannot be met due to a frequency domain resource unit autonomously configured or activated by the access network device.

With reference to FIG. 4 to FIG. 13, the following describes the frequency domain resource activation methods provided in the embodiments of this application, by using an example in which first information includes first assistance information, the first assistance information includes or indicates one or more of a maximum bandwidth that is of a frequency domain resource unit and that is preferred by a terminal, a maximum quantity that is of frequency domain resource units and that is preferred by the terminal, and a maximum total bandwidth that is of frequency domain resource units and that is preferred by the terminal, or indication information of a frequency domain resource unit preferred by the terminal, or a maximum quantity that is of blind decoding times of a PDCCH and that is preferred by the terminal, or working status information of the terminal, and an access network device activates a frequency domain resource unit of the terminal based on the first assistance information.

Figure 4:
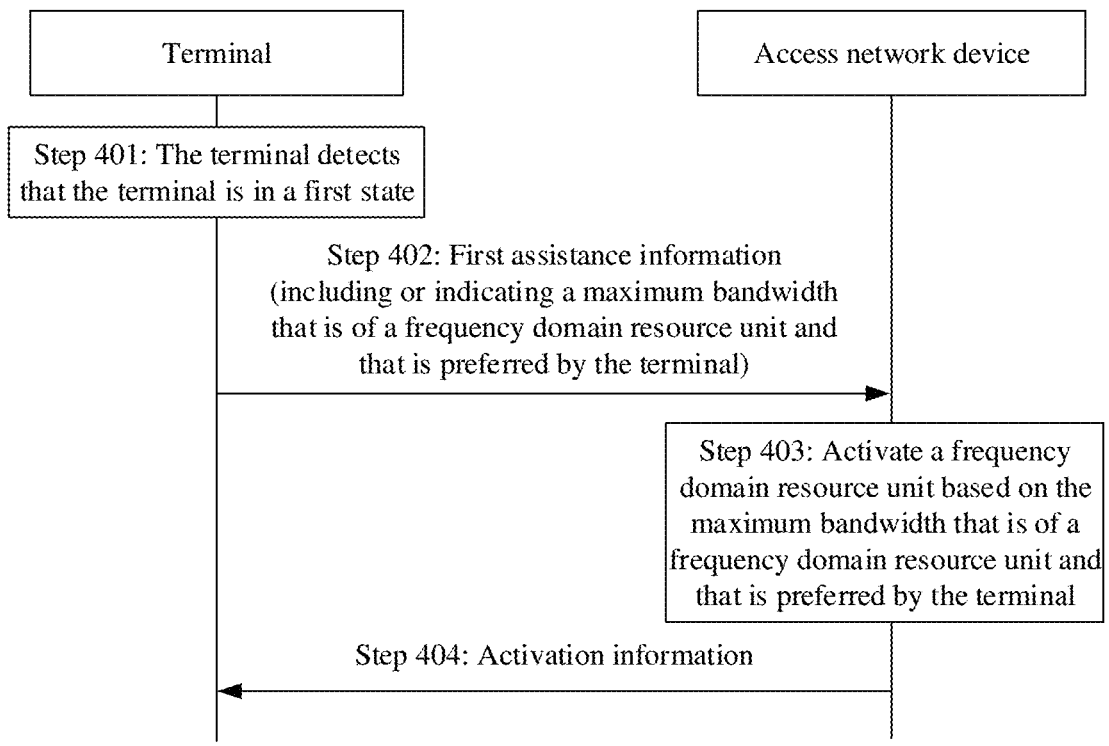
FIG. 4 is a flowchart of another frequency domain resource activation method according to an embodiment of this application.

FIG. 4 is a flowchart of another frequency domain resource activation method according to an embodiment of this application. As shown in FIG. 4, the method may include the following steps.

Step 401: A terminal detects that the terminal is in a first state.

For descriptions of the first state, refer to the descriptions in FIG. 3. Details are not described again.

Step 402: The terminal sends first assistance information to an access network device, where the first assistance information includes or indicates a maximum bandwidth that is of a frequency domain resource unit and that is preferred by the terminal.

The maximum bandwidth that is of a frequency domain resource unit and that is preferred by the terminal is a maximum bandwidth of a frequency domain resource unit that the terminal expects to activate, and a bandwidth of a frequency domain resource unit activated by the access network device is not expected to exceed the maximum bandwidth.

The maximum bandwidth of a frequency domain resource unit may be a specific bandwidth value, for example, 100 MHz; or may be indicated by a quantity of physical resource blocks (Physical Resource Block, PRB), for example, 50 indicates that the maximum bandwidth is a bandwidth corresponding to 50 physical resource blocks; or may be determined based on a frequency domain resource unit preconfigured by the access network device for the terminal. A number of a frequency domain resource unit corresponding to the maximum bandwidth is reported to the access network device, so that the access network device determines, based on the number, the maximum bandwidth that is of a frequency domain resource unit and that is preferred by the terminal. For example, frequency domain resource units preconfigured by the access network device for the terminal are four frequency domain resource units: a frequency domain resource unit 1 to a frequency domain resource unit 4. A bandwidth of the frequency domain resource unit 1 is 150 MHz, a bandwidth of the frequency domain resource unit 2 is 100 MHz, a bandwidth of the frequency domain resource unit 3 is 50 MHz, and a bandwidth of the frequency domain resource unit 4 is 30 MHz. In this case, if the maximum bandwidth that is of a frequency domain resource unit and that is preferred by the terminal is 100 MHz, the terminal may add a number 2 of the frequency domain resource unit 2 to the first information and send the first information to the access network device, so that the access network device identifies, based on the number 2, that the maximum bandwidth that is of a frequency domain resource unit and that is preferred by the terminal is the bandwidth 100 MHz of the frequency domain resource unit 2.

For example, it is assumed that a frequency domain resource unit is a BWP, the terminal requests to activate a downlink (DownLink, DL) BWP and an uplink (UpLink, UL) BWP, a maximum bandwidth that is of a BWP and that is preferred by the terminal corresponds to a BWP number, and the first assistance information is carried in an information element of air interface signaling. In this case, a format of the information element is as follows:

```
RRCSignalling=SEQUENCE{
...
reducedBwpBandwidthDL INTEGER(0..maxNrofBWPs) OPTIONAL,
reducedBwpBandwidthUL   INTEGER(0..maxNrofBWPs) OPTIONAL,
...}
``` reducedBwpBandwidthDL represents a maximum bandwidth that is of a downlink BWP and that is preferred by the terminal, maxNrofBWPs represents a maximum number of a BWP preconfigured by the access network device for the terminal, and reducedBwpBandwidthDL INTEGER(0 . . . maxNrofBWPs) OPTIONAL represents that the maximum bandwidth that is of a downlink BWP and that is preferred by the terminal may be a bandwidth of a BWP corresponding to any one of numbers 0 to maxNrofBWPs.

Similarly, reducedBwpBandwidthUL INTEGER(0 . . . maxNrofBWPs) OPTIONAL represents that a maximum bandwidth that is of an uplink BWP and that is preferred by the terminal may be a bandwidth of a BWP corresponding to any one of numbers 0 to maxNrofBWPs.

Step 403: The access network device receives the first information, and activates a frequency domain resource unit based on the maximum bandwidth that is of a frequency domain resource unit and that is preferred by the terminal.

Optionally, that the access network device activates a frequency domain resource unit based on the maximum bandwidth that is of a frequency domain resource unit and that is preferred by the terminal includes the following: The access network device selects a frequency domain resource unit whose bandwidth is less than or equal to the maximum bandwidth that is of a frequency domain resource unit and that is preferred by the terminal, and activates the selected frequency domain resource unit. For example, if the maximum bandwidth that is of a frequency domain resource unit and that is preferred by the terminal is 100 MHz, a bandwidth of the frequency domain resource unit activated by the access network device needs to be less than or equal to 100 MHz.

Step 404: The access network device sends activation information to the terminal.

For the activation information, refer to the descriptions in FIG. 3. Details are not described again.

It should be noted that the maximum bandwidth that is of a frequency domain resource unit and that is preferred by the terminal in FIG. 4 may be replaced with a bandwidth that is of a frequency domain resource unit and that is preferred by the terminal. In other words, the terminal specifies a bandwidth of an active frequency domain resource unit for the access network device, so that the bandwidth of the active frequency domain resource unit meets a requirement of the terminal. For example, if the bandwidth that is of a frequency domain resource unit and that is preferred by the terminal is 50 MHz, the bandwidth of the frequency domain resource unit activated by the access network device also needs to be 50 MHz.

Based on the method shown in FIG. 4, the terminal may limit a bandwidth of a frequency domain resource unit, so that the network side device activates a small-bandwidth frequency domain resource unit, thereby reducing power consumption of the terminal and reducing heating.

It should be noted that the maximum bandwidth that is of a frequency domain resource unit and that is preferred by the terminal may be set to a maximum value supported by a protocol, so that an effect is equivalent to not limiting the bandwidth of the frequency domain resource unit, and the network side device may configure or activate the frequency domain resource unit based on capability information of the terminal.

Figure 5:
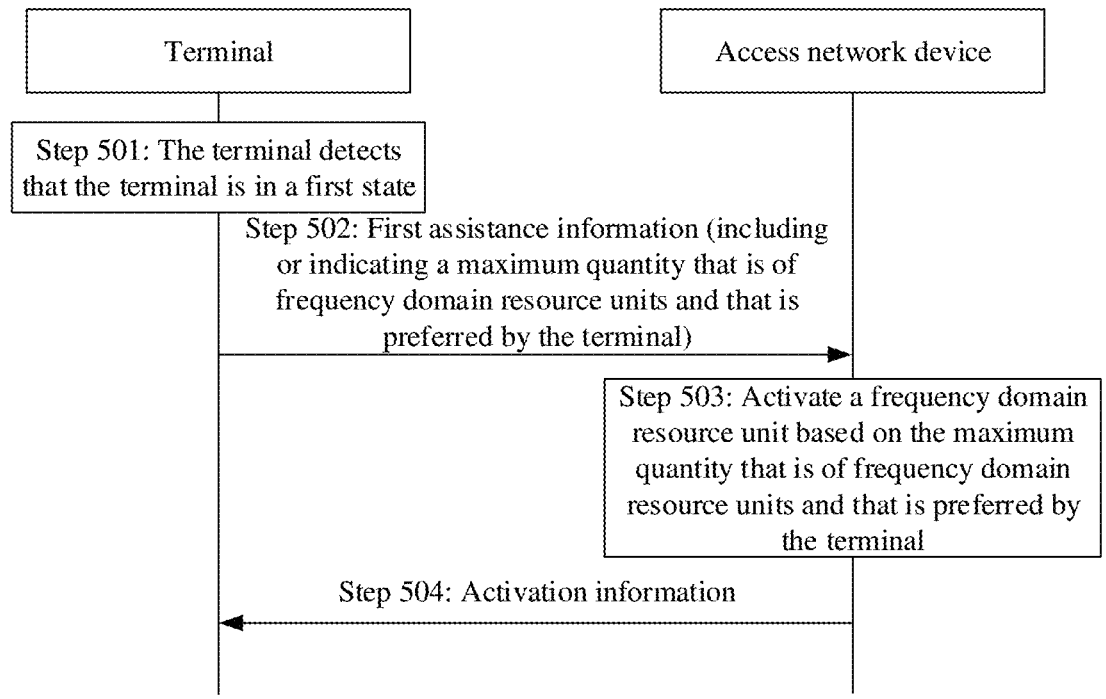
FIG. 5 is a flowchart of another frequency domain resource activation method according to an embodiment of this application.

FIG. 5 is a flowchart of another frequency domain resource activation method according to an embodiment of this application. As shown in FIG. 5, the method may include the following steps.

Step 501: A terminal detects that the terminal is in a first state.

For descriptions of the first state, refer to the descriptions in FIG. 3. Details are not described again.

Step 502: The terminal sends first assistance information to an access network device, where the first assistance information includes or indicates a maximum quantity that is of frequency domain resource units and that is preferred by the terminal.

The maximum quantity that is of frequency domain resource units and that is preferred by the terminal is a maximum quantity of frequency domain resource units that the terminal expects to activate, and a total quantity of frequency domain resource units activated by the access network device is not expected to exceed the maximum quantity. Specifically, the maximum quantity that is of frequency domain resource units and that is preferred by the terminal is determined based on a frequency domain resource unit preconfigured by the access network device for the terminal. Optionally, the maximum quantity that is of frequency domain resource units and that is preferred by the terminal does not exceed a quantity of frequency domain resource units preconfigured by the access network device for the terminal. The terminal may directly report, to the access network device, a specific value of the maximum quantity that is of frequency domain resource units and that is preferred by the terminal. For example, the frequency domain resource units preconfigured by the access network device for the terminal are four frequency domain resource units: a frequency domain resource unit 1 to a frequency domain resource unit 4. In this case, the maximum quantity that is of frequency domain resource units and that is preferred by the terminal may be any value from 1 to 4.

For example, it is assumed that a frequency domain resource unit is a BWP, the terminal requests to activate a downlink (DownLink, DL) BWP and an uplink (UpLink, DL) BWP, and the first assistance information is carried in an information element of air interface signaling. In this case, a format of the information element is as follows:

```
RRCSignalling=SEQUENCE{
...
reducedBwpActiveNumDL INTEGER(1..maxNrofActiveBWPs) OPTIONAL,
reducedBwpActiveNumUL INTEGER(1..maxNrofActiveBWPs) OPTIONAL,
...}
``` reducedBwpActiveNumDL represents a maximum quantity that is of BWPs and that is preferred by the terminal, maxNrofActiveBWPs represents a protocol-supported maximum quantity of BWPs preconfigured by the access network device for the terminal, and reducedBwpActiveNumDL INTEGER(1 . . . maxNrofActiveBWPs) OPTIONAL represents that a quantity that is of BWPs and that is preferred by the terminal may be any value from 1 to maxNrofActiveBWPs.

reducedBwpActiveNumUL INTEGER(1 . . . maxNrofActiveBWPs) OPTIONAL represents that a maximum quantity that is of simultaneously activated uplink BWPs and that is preferred by the terminal may be any value from 1 to maxNrofActiveBWPs.

Step 503: The access network device receives the first assistance information, and activates a frequency domain resource unit based on the maximum quantity that is of frequency domain resource units and that is preferred by the terminal.

Optionally, that the access network device activates a frequency domain resource unit based on the maximum quantity that is of frequency domain resource units and that is preferred by the terminal includes the following: The access network device selects a frequency domain resource unit whose quantity is less than or equal to the maximum quantity that is of frequency domain resource units and that is preferred by the terminal, and activates the selected frequency domain resource unit. For example, if the maximum quantity that is of frequency domain resource units and that is preferred by the terminal is 3, a quantity of frequency domain resource units activated by the access network device is less than or equal to 3.

Step 504: The access network device sends activation information to the terminal.

For the activation information, refer to the descriptions in FIG. 3. Details are not described again.

It should be noted that the maximum quantity that is of frequency domain resource units and that is preferred by the terminal in FIG. 5 may be replaced with a quantity that is of frequency domain resource units and that is preferred by the terminal. In other words, the terminal specifies a quantity of active frequency domain resource units for the access network device, so that the quantity of active frequency domain resource units meets a requirement of the terminal. For example, if the quantity that is of frequency domain resource units and that is preferred by the terminal is 3, a quantity of frequency domain resource units activated by the access network device also needs to be 3.

Based on the method shown in FIG. 5, the terminal may limit a quantity of frequency domain resource units, so that the network side device activates a comparatively small quantity of frequency domain resource units, thereby reducing power consumption of the terminal and reducing heating.

It should be noted that the maximum quantity that is of frequency domain resource units and that is preferred by the terminal in FIG. 5 may be set to a maximum value supported by a protocol, so that an effect is equivalent to not limiting the quantity of frequency domain resource units, and the network side device may configure or activate the frequency domain resource unit based on capability information of the terminal.

Figure 6:
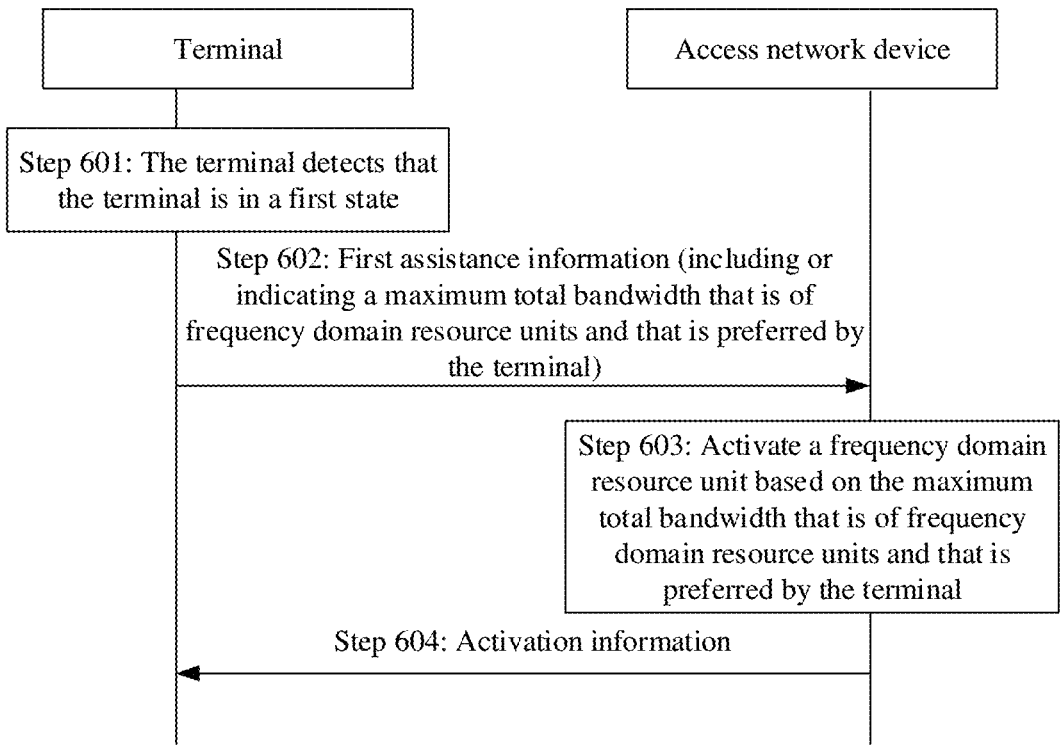
FIG. 6 is a flowchart of another frequency domain resource activation method according to an embodiment of this application.

FIG. 6 is a flowchart of another frequency domain resource activation method according to an embodiment of this application. As shown in FIG. 6, the method may include the following steps.

Step 601: A terminal detects that the terminal is in a first state.

For descriptions of the first state, refer to the descriptions in FIG. 3. Details are not described again.

Step 602: The terminal sends first assistance information to an access network device, where the first assistance information includes or indicates a maximum total bandwidth that is of frequency domain resource units and that is preferred by the terminal.

The maximum total bandwidth that is of frequency domain resource units and that is preferred by the terminal may be a maximum value of a total bandwidth of all frequency domain resource units that the terminal expects to activate, and a total bandwidth of frequency domain resource units activated by the access network device is not expected to exceed the maximum total bandwidth. The terminal may directly report, to the access network device, a specific value (for example, 200 MHz) of the maximum total bandwidth that is of frequency domain resource units and that is preferred by the terminal. Alternatively, a quantity of PRBs is used to indicate the maximum total bandwidth. For example, 100 indicates that the maximum total bandwidth is a bandwidth corresponding to 100 physical resource blocks.

It is assumed that a frequency domain resource unit is a BWP, the terminal requests to activate a downlink (DownLink, DL) BWP and an uplink (UpLink, DL) BWP, a maximum total bandwidth that is of BWPs and that is preferred by the terminal is indicated by a quantity of physical resource blocks, and the first assistance information is carried in an information element of air interface signaling. In this case, a format of the information element is as follows:

```
RRCSignallingI:=SEQUENCE{
...
reducedTotalBwpBWDL INTEGER(1..maxNrofPhysicalResourceBlocks) OPTIONAL,
reducedTotalBwpBWUL INTEGER(1..maxNrofPhysicalResourceBlocks) OPTIONAL,
...}
``` maxNrofPhysicalResourceBlocks represents a maximum quantity of physical resource blocks supported by a protocol; reducedTotalBwpBWDL represents a maximum total bandwidth that is of downlink BWPs and that is preferred by the terminal, whose unit is a physical resource block; and reducedTotalBwpBWDL INTEGER(1 . . . maxNrofPhysicalResourceBlocks) OPTIONAL represents that the maximum total bandwidth that is of downlink BWPs and that is preferred by the terminal may be any value from 1 to the protocol-supported maximum quantity of physical resource blocks.

reducedTotalBwpBWUL represents a maximum total uplink bandwidth preferred by the terminal, whose unit is a physical resource block; and reducedTotalB BWUL INTEGER(1 . . . maxNrofPhysicalResourceBlocks) OPTIONAL represents that the maximum total bandwidth that is of uplink BWPs and that is preferred by the terminal may be any value from 1 to the protocol-supported maximum quantity of physical resource blocks.

Step 603: The access network device receives first information, and activates a frequency domain resource unit based on the maximum total bandwidth that is of frequency domain resource units and that is preferred by the terminal.

Optionally, that the access network device activates a frequency domain resource unit based on the maximum total bandwidth that is of frequency domain resource units and that is preferred by the terminal includes the following: The access network device selects a frequency domain resource unit whose total bandwidth is less than or equal to the maximum total bandwidth that is of frequency domain resource units and that is preferred by the terminal, and activates the selected frequency domain resource unit. For example, if the maximum total bandwidth that is of frequency domain resource units and that is preferred by the terminal is 330 MHz, a total bandwidth of frequency domain resource units activated by the access network device is less than or equal to 330 MHz.

Step 604: The access network device sends activation information to the terminal.

For the activation information, refer to the descriptions in FIG. 3. Details are not described again.

It should be noted that the maximum total bandwidth that is of frequency domain resource units and that is preferred by the terminal in FIG. 6 may be replaced with a total bandwidth that is of frequency domain resource units and that is preferred by the terminal. In other words, the terminal specifies a total bandwidth of active frequency domain resource units for the access network device, so that the total bandwidth of active frequency domain resource units meets a requirement of the terminal. For example, if the total bandwidth that is of frequency domain resource units and that is preferred by the terminal is 200 MHz, a total bandwidth of frequency domain resource units activated by the access network device also needs to be 200 MHz.

Based on the method shown in FIG. 6, the terminal may limit a total bandwidth of frequency domain resource units, so that a total bandwidth of frequency domain resource units activated by the network side device is reduced, thereby reducing power consumption of the terminal and reducing heating.

It should be noted that the maximum total bandwidth that is of frequency domain resource units and that is preferred by the terminal in FIG. 6 may be set to a maximum value supported by a protocol, so that an effect is equivalent to not limiting the total bandwidth of frequency domain resource units, and the network side device may configure or activate the frequency domain resource unit based on capability information of the terminal.

Figure 7:
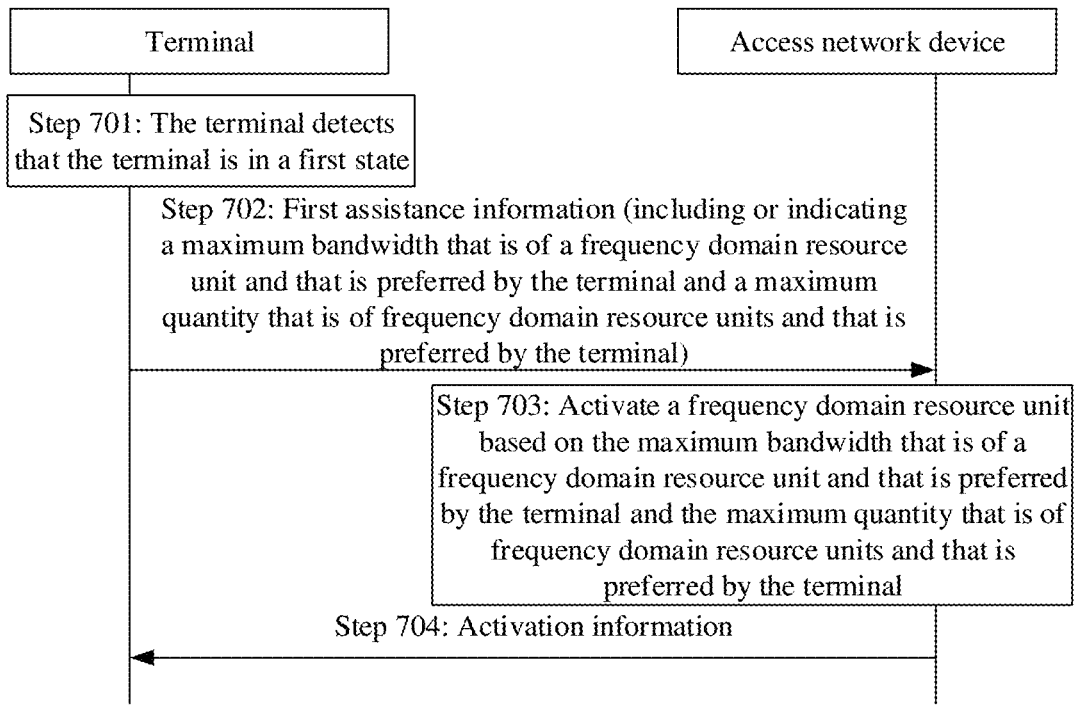
FIG. 7 is a flowchart of another frequency domain resource activation method according to an embodiment of this application.

FIG. 7 is a flowchart of another frequency domain resource activation method according to an embodiment of this application. As shown in FIG. 7, the method may include the following steps.

Step 701: A terminal detects that the terminal is in a first state.

For descriptions of the first state, refer to the descriptions in FIG. 3. Details are not described again.

Step 702: The terminal sends first assistance information to an access network device, where the first assistance information includes or indicates a maximum bandwidth that is of a frequency domain resource unit and that is preferred by the terminal and a maximum quantity that is of frequency domain resource units and that is preferred by the terminal.

For the maximum bandwidth that is of a frequency domain resource unit and that is preferred by the terminal, refer to the descriptions in FIG. 4. For the maximum quantity that is of frequency domain resource units and that is preferred by the terminal, refer to the descriptions in FIG. 5. Details are not described again.

For example, it is assumed that a frequency domain resource unit is a BWP, the terminal requests to activate a downlink (DownLink, DL) BWP and an uplink (UpLink, DL) BWP, a maximum bandwidth that is of a BWP and that is preferred by the terminal corresponds to a BWP number, and first assistance information is carried in an information element of air interface signaling. In this case, a format of the information element is as follows:

and the maximum quantity that is of frequency domain resource units and that is preferred by the terminal.

Specifically, that the access network device activates a frequency domain resource unit based on the maximum bandwidth that is of a frequency domain resource unit and that is preferred by the terminal and the maximum quantity that is of frequency domain resource units and that is preferred by the terminal may include the following:

The access network device selects to activate one or more frequency domain resource units, so that a bandwidth of each of the activated one or more frequency domain resource units is less than or equal to the maximum bandwidth that is of a frequency domain resource unit and that is preferred by the terminal, and a total quantity of the activated one or more frequency domain resource units is less than or equal to the maximum quantity that is of frequency domain resource units and that is preferred by the terminal. It should be noted that, if a current frequency domain resource unit configuration cannot meet the foregoing condition, the access network device may reconfigure one or more frequency domain resource units. For example, a bandwidth of each current frequency domain resource unit is greater than the maximum bandwidth that is of a frequency domain resource unit and that is preferred by the terminal, and the access network device configures a bandwidth of each of the one or more frequency domain resource units to be less than the maximum bandwidth that is of a frequency domain resource unit and that is preferred by the terminal.

For example, frequency domain resource units preconfigured by the access network device for the terminal are four frequency domain resource units: a frequency domain resource unit 1 to a frequency domain resource unit 4. A bandwidth of the frequency domain resource unit 1 is 150 MHz, a bandwidth of the frequency domain resource unit 2 is 100 MHz, a bandwidth of the frequency domain resource unit 3 is 50 MHz, and a bandwidth of the frequency domain resource unit 4 is 30 MHz. The maximum bandwidth that is of a frequency domain resource unit and that is preferred by the terminal is 100 MHz, and the maximum quantity that is of frequency domain resource units and that is preferred by the terminal is 2. In this case, frequency domain resource units activated by the access network device may be the frequency domain resource unit 3 and the frequency domain resource unit 4.

Step 704: The access network device sends activation information to the terminal.

For the activation information, refer to the descriptions in FIG. 3. Details are not described again.

It should be noted that the maximum bandwidth that is of a frequency domain resource unit and that is preferred by the

```
RRCSignalling=SEQUENCE{
...
reducedBwpBandwidthDL INTEGER(0..maxNrofBWPs) OPTIONAL,
reducedBwpActiveNumDL INTEGER(1..maxNrofActiveBWPs) OPTIONAL,
reducedBwpBandwidthUL      INTEGER(0..maxNrofBWPs) OPTIONAL,
reducedBwpActiveNumUL INTEGER(1..maxNrofActiveBWPs) OPTIONAL,
...}
```

For content included in the information element in FIG. 7, refer to the descriptions in FIG. 4 and FIG. 5. Details are not described again.

Step 703: The access network device receives the first information, and activates a frequency domain resource unit based on the maximum bandwidth that is of a frequency domain resource unit and that is preferred by the terminal terminal in FIG. 7 may be replaced with a bandwidth that is of a frequency domain resource unit and that is preferred by the terminal, or the maximum quantity that is of frequency domain resource units and that is preferred by the terminal in FIG. 7 may be replaced with a quantity that is of frequency domain resource units and that is preferred by the terminal.

Based on the method shown in FIG. 7, the terminal may limit a bandwidth of a frequency domain resource unit and a quantity of active frequency domain resource units, so that the network side device activates a small-bandwidth frequency domain resource unit, and reduces a quantity of simultaneously activated frequency domain resource units, thereby reducing power consumption of the terminal and reducing heating.

It should be noted that the maximum bandwidth that is of a frequency domain resource unit and that is preferred by the terminal and the maximum quantity that is of frequency domain resource units and that is preferred by the terminal each may be set to a maximum value supported by a protocol, so that an effect is equivalent to limiting neither a bandwidth of a frequency domain resource unit nor a quantity of frequency domain resource units, and the network side device may configure or activate the frequency domain resource unit based on capability information of the terminal.

Figure 8:
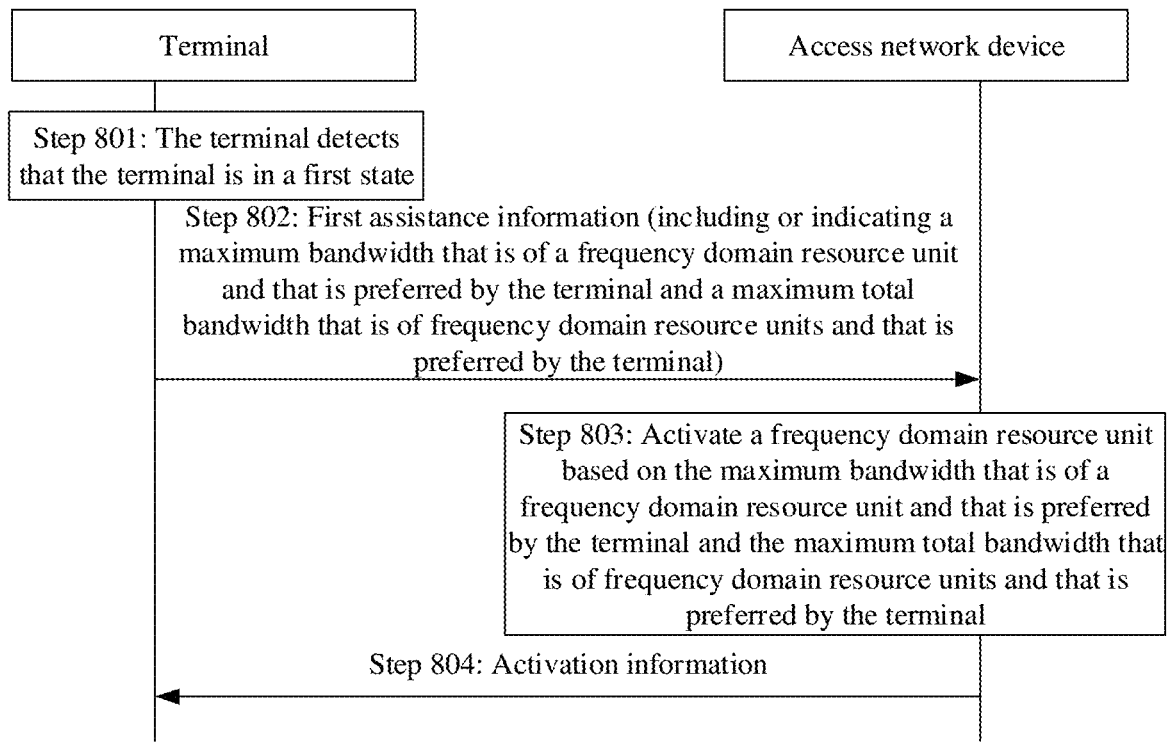
FIG. 8 is a flowchart of another frequency domain resource activation method according to an embodiment of this application.

FIG. 8 is a flowchart of another frequency domain resource activation method according to an embodiment of this application. As shown in FIG. 8, the method may include the following steps.

Step 801: A terminal detects that the terminal is in a first state.

For descriptions of the first state, refer to the descriptions in FIG. 3. Details are not described again.

Step 802: The terminal sends first assistance information to an access network device, where the first assistance information includes or indicates a maximum bandwidth that is of a frequency domain resource unit and that is preferred by the terminal and a maximum total bandwidth that is of frequency domain resource units and that is preferred by the terminal.

For the maximum bandwidth that is of a frequency domain resource unit and that is preferred by the terminal, refer to the descriptions in FIG. 4. For the maximum total bandwidth that is of frequency domain resource units and that is preferred by the terminal, refer to the descriptions in FIG. 6. Details are not described again.

It is assumed that a frequency domain resource unit is a BWP, the terminal requests to activate a downlink (DownLink, DL) BWP and an uplink (UpLink, DL) BWP, a maximum bandwidth that is of a BWP and that is preferred by the terminal and a maximum total bandwidth that is of BWPs and that is preferred by the terminal each are indicated by a quantity of physical resource blocks, and first assistance information is carried in an information element of air interface signaling. In this case, a format of the information element is as follows:

and the maximum total bandwidth that is of frequency domain resource units and that is preferred by the terminal.

Specifically, that the access network device activates a frequency domain resource unit based on the maximum bandwidth that is of a frequency domain resource unit and that is preferred by the terminal and the maximum total bandwidth that is of frequency domain resource units and that is preferred by the terminal may include the following:

The access network device selects to activate one or more frequency domain resource units, so that a bandwidth of each of the activated one or more frequency domain resource units is less than or equal to the maximum bandwidth that is of a frequency domain resource unit and that is preferred by the terminal, and a total bandwidth of the activated one or more frequency domain resource units is less than or equal to the maximum total bandwidth that is of frequency domain resource units and that is preferred by the terminal. It should be noted that, if a current frequency domain resource unit configuration cannot meet the foregoing condition, the access network device may reconfigure one or more frequency domain resource units. For example, a bandwidth of each current frequency domain resource unit is greater than the maximum bandwidth that is of a frequency domain resource unit and that is preferred by the terminal, and the access network device configures a bandwidth of each of the one or more frequency domain resource units to be less than the maximum bandwidth that is of a frequency domain resource unit and that is preferred by the terminal.

For example, frequency domain resource units preconfigured by the access network device for the terminal are four frequency domain resource units: a frequency domain resource unit 1 to a frequency domain resource unit 4. A bandwidth of the frequency domain resource unit 1 is 150 MHz, a bandwidth of the frequency domain resource unit 2 is 100 MHz, a bandwidth of the frequency domain resource unit 3 is 50 MHz, and a bandwidth of the frequency domain resource unit 4 is 30 MHz. The maximum bandwidth that is of a frequency domain resource unit and that is preferred by the terminal is 100 MHz, and the maximum total bandwidth that is of frequency domain resource units and that is preferred by the terminal is 50 MHz. In this case, the frequency domain resource unit activated by the access network device may be the frequency domain resource unit 4.

Step 804: The access network device sends activation information to the terminal.

For the activation information, refer to the descriptions in FIG. 3. Details are not described again.

```
RRCSignallingI=SEQUENCE{
...
reducedTotalBwpBWDL INTEGER(1..maxNrofPhysicalResourceBlocks) OPTIONAL,
reducedBwpBWDL INTEGER(1..maxNrofPhysicalResourceBlocks) OPTIONAL,
reducedTotalBwpBWUL INTEGER(1..maxNrofPhysicalResourceBlocks) OPTIONAL,
reducedBwpBWUL INTEGER(1..maxNrofPhysicalResourceBlocks) OPTIONAL,
...}
```

For content included in the information element in FIG. 8, refer to the descriptions in FIG. 4 and FIG. 6. Details are not described again.

Step 803: The access network device receives the first information, and activates a frequency domain resource unit based on the maximum bandwidth that is of a frequency domain resource unit and that is preferred by the terminal It should be noted that the maximum bandwidth that is of a frequency domain resource unit and that is preferred by the terminal in FIG. 8 may be replaced with a bandwidth that is of a frequency domain resource unit and that is preferred by the terminal, or the maximum total bandwidth that is of frequency domain resource units and that is preferred by the terminal in FIG. 8 may be replaced with a total bandwidth that is of frequency domain resource units and that is preferred by the terminal.

Based on the method shown in FIG. 8, the terminal may limit a bandwidth of a single frequency domain resource unit and a total bandwidth of active frequency domain resource units, so that the network side device activates a small-bandwidth frequency domain resource unit, and reduces a total bandwidth of simultaneously activated frequency domain resource units, thereby reducing power consumption of the terminal and reducing heating.

It should be noted that the maximum bandwidth that is of a frequency domain resource unit and that is preferred by the terminal and the maximum total bandwidth that is of frequency domain resource units and that is preferred by the terminal in FIG. 8 each may be set to a maximum value supported by a protocol, so that an effect is equivalent to limiting neither a bandwidth of a frequency domain resource unit nor a total bandwidth of frequency domain resource units, and the network side device may configure or activate the frequency domain resource unit based on capability information of the terminal.

Figure 9:
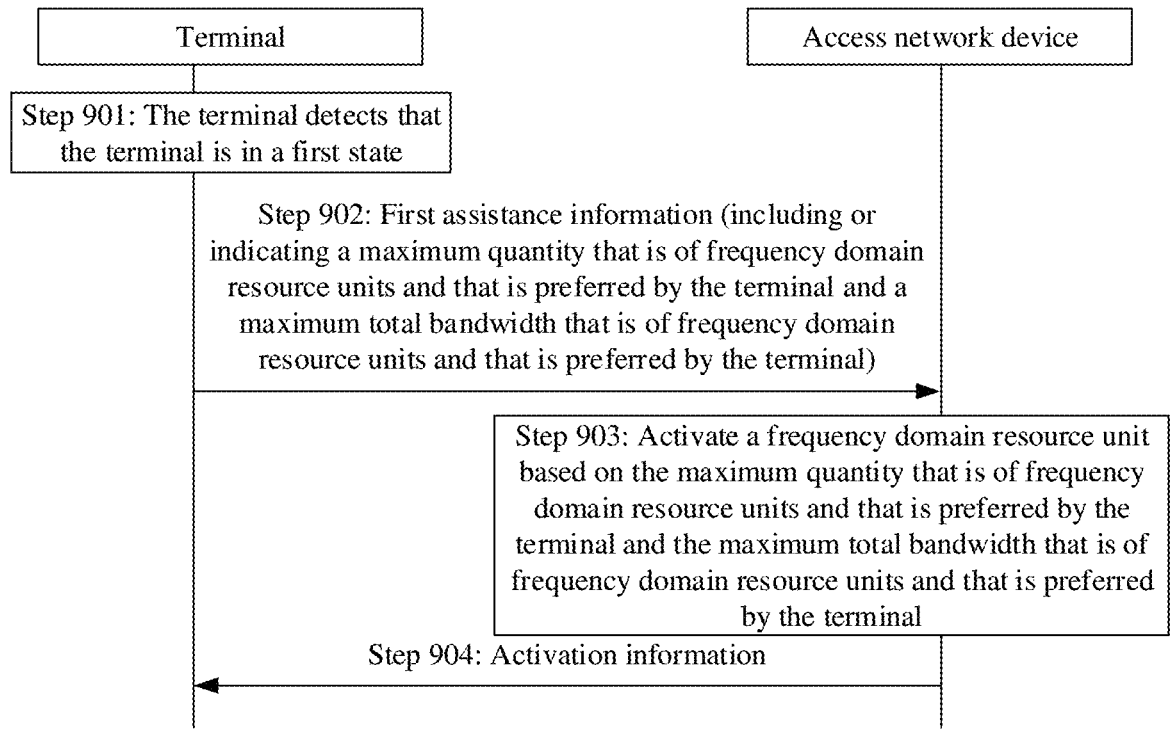
FIG. 9 is a flowchart of another frequency domain resource activation method according to an embodiment of this application.

FIG. 9 is a flowchart of another frequency domain resource activation method according to an embodiment of this application. As shown in FIG. 9, the method may include the following steps.

Step 901: A terminal detects that the terminal is in a first state.

For descriptions of the first state, refer to the descriptions in FIG. 3. Details are not described again.

Step 902: The terminal sends first assistance information to an access network device, where the first assistance information includes or indicates a maximum quantity that is of frequency domain resource units and that is preferred by the terminal and a maximum total bandwidth that is of frequency domain resource units and that is preferred by the terminal.

For the maximum quantity that is of frequency domain resource units and that is preferred by the terminal, refer to the descriptions in FIG. 5. For the maximum total bandwidth that is of frequency domain resource units and that is preferred by the terminal, refer to the descriptions in FIG. 6. Details are not described again.

It is assumed that a frequency domain resource unit is a BWP, the terminal requests to activate a downlink (Down-Link, DL) BWP and an uplink (UpLink, DL) BWP, a maximum total bandwidth that is of BWPs and that is preferred by the terminal is indicated by a quantity of physical resource blocks, and first assistance information is carried in an information element of air interface signaling. In this case, a format of the information element is as follows:

based on the maximum quantity that is of frequency domain resource units and that is preferred by the terminal and the maximum total bandwidth that is of frequency domain resource units and that is preferred by the terminal.

Specifically, that the access network device activates a frequency domain resource unit based on the maximum quantity that is of frequency domain resource units and that is preferred by the terminal and the maximum total bandwidth that is of frequency domain resource units and that is preferred by the terminal may include the following:

The access network device selects to activate one or more frequency domain resource units, so that a bandwidth of each of the activated one or more frequency domain resource units is less than or equal to the maximum quantity that is of frequency domain resource units and that is preferred by the terminal, and a total bandwidth of the activated one or more frequency domain resource units is less than or equal to the maximum total bandwidth that is of frequency domain resource units and that is preferred by the terminal. It should be noted that, if a current frequency domain resource unit configuration cannot meet the foregoing condition, the access network device may reconfigure one or more frequency domain resource units. For example, a bandwidth of all current frequency domain resource units is greater than the maximum total bandwidth that is of frequency domain resource units and that is preferred by the terminal, and the access network device configures a bandwidth of the one or more frequency domain resource units to be less than the maximum total bandwidth that is of frequency domain resource units and that is preferred by the terminal.

For example, frequency domain resource units preconfigured by the access network device for the terminal are four frequency domain resource units: a frequency domain resource unit 1 to a frequency domain resource unit 4. A bandwidth of the frequency domain resource unit 1 is 150 MHz, a bandwidth of the frequency domain resource unit 2 is 100 MHz, a bandwidth of the frequency domain resource unit 3 is 50 MHz, and a bandwidth of the frequency domain resource unit 4 is 30 MHz. Therefore, the maximum total bandwidth that is of frequency domain resource units and that is preferred by the terminal cannot exceed 330 MHz. The maximum quantity that is of frequency domain resource units and that is preferred by the terminal is 3, and the maximum total bandwidth that is of frequency domain resource units and that is preferred by the terminal is 100 MHz. In this case, frequency domain resource units activated by the access network device may be the frequency domain resource unit 3 and the frequency domain resource unit 4.

Step 904: The access network device sends activation information to the terminal.

```
RRCSignallingI=SEQUENCE{
...
reducedTotalBwpBWDL INTEGER(1..maxNrofPhysicalResourceBlocks) OPTIONAL,
reducedBwpActiveNumDL INTEGER(1..maxNrofActiveBWPs) OPTIONAL,
reducedTotalBwpBWUL INTEGER(1..maxNrofPhysicalResourceBlocks) OPTIONAL,
reducedBwpActiveNumUL INTEGER(1..maxNrofActiveBWPs) OPTIONAL,
...}
```

For content included in the information element in FIG. 9, refer to the descriptions in FIG. 5 and FIG. 6. Details are not described again.

Step 903: The access network device receives the first information, and activates a frequency domain resource unit For the activation information, refer to the descriptions in FIG. 3. Details are not described again.

It should be noted that the maximum quantity that is of frequency domain resource units and that is preferred by the terminal in FIG. 9 may be replaced with a quantity that is of frequency domain resource units and that is preferred by the terminal, or the maximum total bandwidth that is of frequency domain resource units and that is preferred by the terminal in FIG. 9 may be replaced with a total bandwidth that is of frequency domain resource units and that is preferred by the terminal.

Based on the method shown in FIG. 9, the terminal may limit a total quantity of frequency domain resource units and a total bandwidth of active frequency domain resource units, so that the network side device reduces a total quantity of active frequency domain resource units, and reduces a total bandwidth of simultaneously activated frequency domain resource units, thereby reducing power consumption of the terminal and reducing heating.

Figure 10:
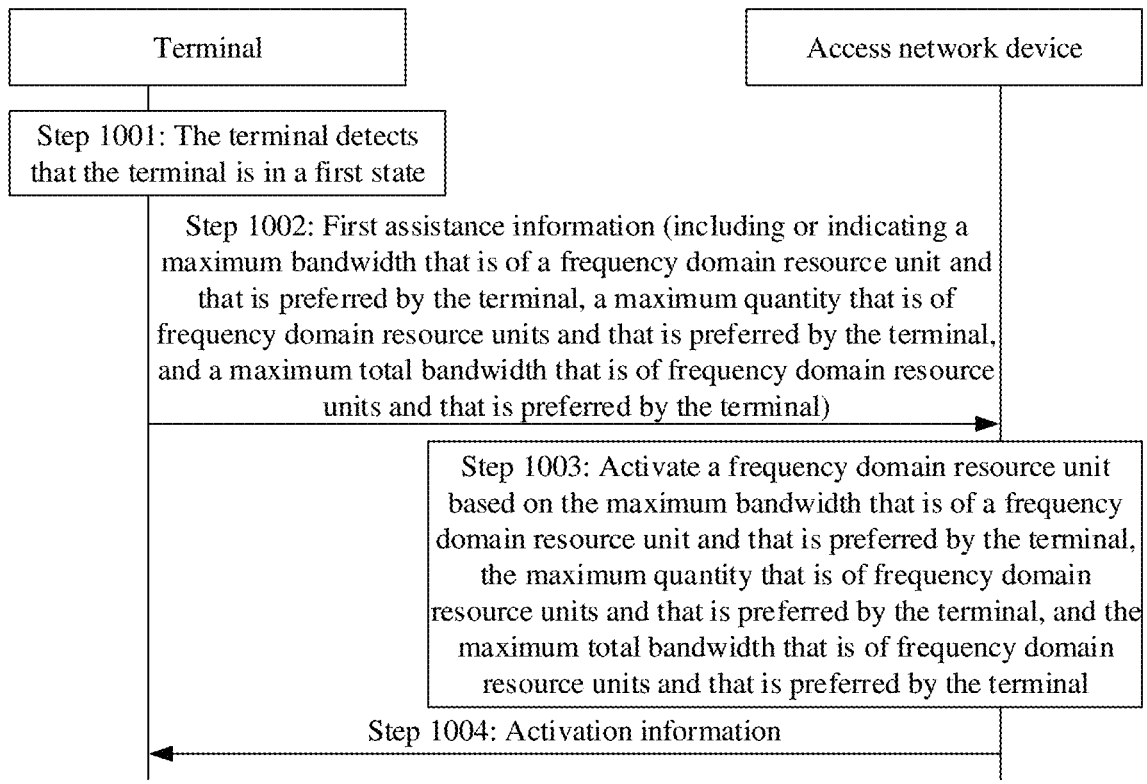
FIG. 10 is a flowchart of another frequency domain resource activation method according to an embodiment of this application.

FIG. 10 is a flowchart of another frequency domain resource activation method according to an embodiment of this application. As shown in FIG. 10, the method may include the following steps.

Step 1001: A terminal detects that the terminal is in a first state.

For descriptions of the first state, refer to the descriptions in FIG. 3. Details are not described again.

Step 1002: The terminal sends first assistance information to an access network device, where the first assistance information includes or indicates a maximum bandwidth that is of a frequency domain resource unit and that is preferred by the terminal, a maximum quantity that is of frequency domain resource units and that is preferred by the terminal, and a maximum total bandwidth that is of frequency domain resource units and that is preferred by the terminal.

For the maximum bandwidth that is of a frequency domain resource unit and that is preferred by the terminal, refer to the descriptions in FIG. 4. For the maximum quantity that is of frequency domain resource units and that is preferred by the terminal, refer to the descriptions in FIG. 5. For the maximum total bandwidth that is of frequency domain resource units and that is preferred by the terminal, refer to the descriptions in FIG. 6. Details are not described again.

It is assumed that a frequency domain resource unit is a BWP, the terminal requests to activate a downlink (Down-Link, DL) BWP and an uplink (UpLink, DL) BWP, a maximum bandwidth that is of a BWP and that is preferred by the terminal and a maximum total bandwidth that is of BWPs and that is preferred by the terminal each are indicated by a quantity of physical resource blocks, and first assistance information is carried in an information element of air interface signaling. In this case, a format of the information element is as follows:

```
RRCSignallingI=SEQUENCE{
...
reducedTotalBwpBWDL INTEGER(1..maxNrofPhysicalResourceBlocks) OPTIONAL,
reducedBwpBWDL INTEGER(1..maxNrofPhysicalResourceBlocks) OPTIONAL,
reducedBwpActiveNumDL INTEGER(1..maxNrofActiveBWPs) OPTIONAL,
reducedTotalBwpBWUL INTEGER(1..maxNrofPhysicalResourceBlocks) OPTIONAL,
reducedBwpBWUL INTEGER(1..maxNrofPhysicalResourceBlocks) OPTIONAL,
reducedBwpActiveNumUL INTEGER(1..maxNrofActiveBWPs) OPTIONAL,
...}
```

For content included in the information element in FIG. 10, refer to the descriptions in FIG. 4, FIG. 5, and FIG. 6. Details are not described again.

Step 1003: The access network device receives the first information, and activates a frequency domain resource unit based on the maximum bandwidth that is of a frequency domain resource unit and that is preferred by the terminal, the maximum quantity that is of frequency domain resource units and that is preferred by the terminal, and the maximum total bandwidth that is of frequency domain resource units and that is preferred by the terminal.

Specifically, that the access network device activates a frequency domain resource unit based on the maximum bandwidth that is of a frequency domain resource unit and that is preferred by the terminal, the maximum quantity that is of frequency domain resource units and that is preferred by the terminal, and the maximum total bandwidth that is of frequency domain resource units and that is preferred by the terminal may include the following:

The access network device selects to activate one or more frequency domain resource units, so that a total bandwidth of the activated one or more frequency domain resource units is less than or equal to the maximum total bandwidth preferred by the terminal, a bandwidth of each of the activated one or more frequency domain resource units is less than or equal to the maximum bandwidth preferred by the terminal, and a total quantity of the simultaneously activated one or more frequency domain resource units is less than or equal to the maximum quantity preferred by the terminal. If a current frequency domain resource unit configuration cannot meet the foregoing condition, the access network device may reconfigure one or more frequency domain resource units. For example, a bandwidth of each current frequency domain resource unit is greater than the maximum bandwidth that is of a frequency domain resource unit and that is preferred by the terminal, and the access network device configures a bandwidth of each of the one or more frequency domain resource units to be less than the maximum bandwidth that is of a frequency domain resource unit and that is preferred by the terminal.

Step 1004: The access network device sends activation information to the terminal.

For the activation information, refer to the descriptions in FIG. 3. Details are not described again.

It should be noted that the maximum bandwidth that is of a frequency domain resource unit and that is preferred by the terminal in FIG. 10 may be replaced with a bandwidth that is of a frequency domain resource unit and that is preferred by the terminal, the maximum quantity that is of frequency domain resource units and that is preferred by the terminal in FIG. 10 may be replaced with a quantity that is of frequency domain resource units and that is preferred by the terminal, and the maximum total bandwidth that is of frequency domain resource units and that is preferred by the terminal may be replaced with a total bandwidth that is of frequency domain resource units and that is preferred by the terminal.

Based on the method shown in FIG. 10, the terminal may limit a bandwidth of a frequency domain resource unit, a total quantity of frequency domain resource units, and a total bandwidth of active frequency domain resource units, so that the network side device selects a frequency domain resource unit with a comparatively small bandwidth for activation, reduces a total quantity of active frequency domain resource units, and reduces a total bandwidth of simultaneously activated frequency domain resource units, thereby reducing power consumption of the terminal and reducing heating.

It should be noted that the maximum bandwidth that is of a frequency domain resource unit and that is preferred by the terminal, the maximum quantity that is of frequency domain resource units and that is preferred by the terminal, and the maximum total bandwidth that is of frequency domain resource units and that is preferred by the terminal in FIG. 10 each may be set to a maximum value supported by a protocol, so that an effect is equivalent to limiting none of a bandwidth of a frequency domain resource unit, a quantity of frequency domain resource units, and a total bandwidth of frequency domain resource units, and the network side device may configure or activate the frequency domain resource unit based on capability information of the terminal.

Figure 11:
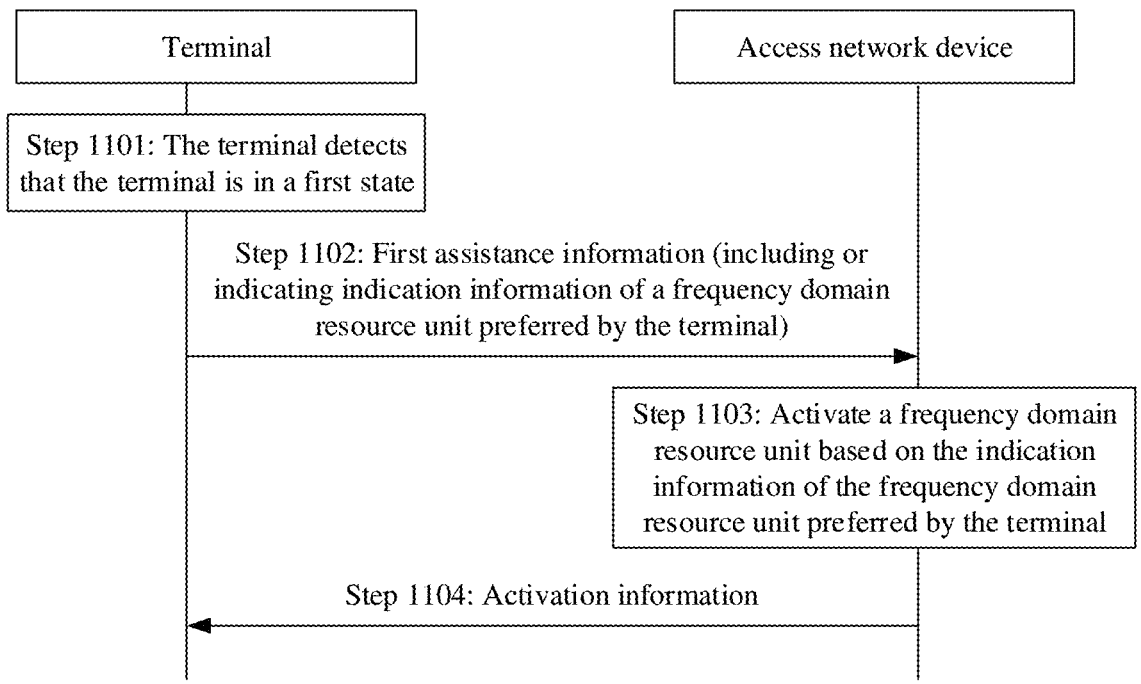
FIG. 11 is a flowchart of another frequency domain resource activation method according to an embodiment of this application.

FIG. 11 is a flowchart of another frequency domain resource activation method according to an embodiment of this application. As shown in FIG. 11, the method may include the following steps.

Step 1101: A terminal detects that the terminal is in a first state.

For descriptions of the first state, refer to the descriptions in FIG. 3. Details are not described again.

Step 1102: The terminal sends first assistance information to an access network device, where the first assistance information includes or indicates indication information of a frequency domain resource unit preferred by the terminal.

The indication information of the frequency domain resource unit preferred by the terminal may be used to indicate the frequency domain resource unit preferred by the terminal. The access network device may select a frequency domain resource unit from the frequency domain resource unit preferred by the terminal, and activate the selected frequency domain resource unit.

The indication information of the frequency domain resource unit preferred by the terminal is determined based on a frequency domain resource unit preconfigured by the access network device for the terminal. For example, the indication information of the frequency domain resource unit preferred by the terminal is used to indicate a frequency domain resource unit included in the frequency domain resource unit preconfigured by the access network device for the terminal.

The terminal may directly report, to the access network device, an identifier of the frequency domain resource unit preferred by the terminal (for example, a number or an index number of the frequency domain resource unit), or may report a bitmap. The bitmap includes at least one bit, and the at least one bit is in a one-to-one correspondence with the frequency domain resource unit preconfigured by the access network device for the terminal. A value of each bit may be 0 or 1, where 0 indicates that a frequency domain resource unit corresponding to the bit is not the frequency domain resource unit preferred by the terminal, and 1 indicates that a frequency domain resource unit corresponding to the bit is the frequency domain resource unit preferred by the terminal. For example, frequency domain resource units preconfigured by the access network device for the terminal are four frequency domain resource units: a frequency domain resource unit 1 to a frequency domain resource unit 4. The four units may correspond to four bits: 0, 1, 1, and 0, to indicate that the frequency domain resource unit 2 and the frequency domain resource unit 3 are frequency domain resource units preferred by the terminal.

It is assumed that a frequency domain resource unit is a BWP, the terminal requests to activate a downlink (DownLink, DL) BWP and an uplink (UpLink, DL) BWP, a BWP preferred by the terminal is indicated by a bitmap, and first assistance information is carried in an information element of air interface signaling. In this case, a format of the information element is as follows:

```
RRCSignallingI=SEQUENCE{
...
preferredBwpDL BIT STRING (SIZE (maxNrofBWPs)) OPTIONAL,
preferredBwpUL BIT STRING (SIZE (maxNrofBWPs)) OPTIONAL,
...}
``` preferredBwpDL represents a set of downlink BWPs preferred by the terminal, and maxNrofBWPs represents a protocol-supported maximum quantity of BWPs configured by the access network device for the terminal. Therefore, numbers of BWPs configured by an access network for the terminal are 1 to maxNrofBWPs. Similarly, preferredBwpUL represents a set of uplink BWPs preferred by the terminal.

Step 1103: The access network device receives the first information, and activates a frequency domain resource unit based on the indication information of the frequency domain resource unit preferred by the terminal.

Specifically, that the access network device activates a frequency domain resource unit based on the indication information of the frequency domain resource unit preferred by the terminal may include the following: The access network device selects one or more frequency domain resource units from a set of resource units preferred by the terminal, and activates the selected frequency domain resource unit.

Step 1104: The access network device sends activation information to the terminal.

For the activation information, refer to the descriptions in FIG. 3. Details are not described again.

Based on the method shown in FIG. 11, the terminal may provide the preferred frequency domain resource unit to the access network device, so that the network side device activates the frequency domain resource unit within an expectation of the terminal, thereby reducing power consumption of the terminal and reducing heating.

It should be noted that the indication bitmap of the frequency domain resource unit preferred by the terminal in FIG. 11 may be set to all 1, that is, the frequency domain resource unit preferred by the terminal is all frequency domain resource units configured by the access network device for the terminal, so that an effect is equivalent to not limiting a frequency domain resource unit, and the network side device may configure or activate the frequency domain resource unit based on capability information of the terminal.

Figure 12:
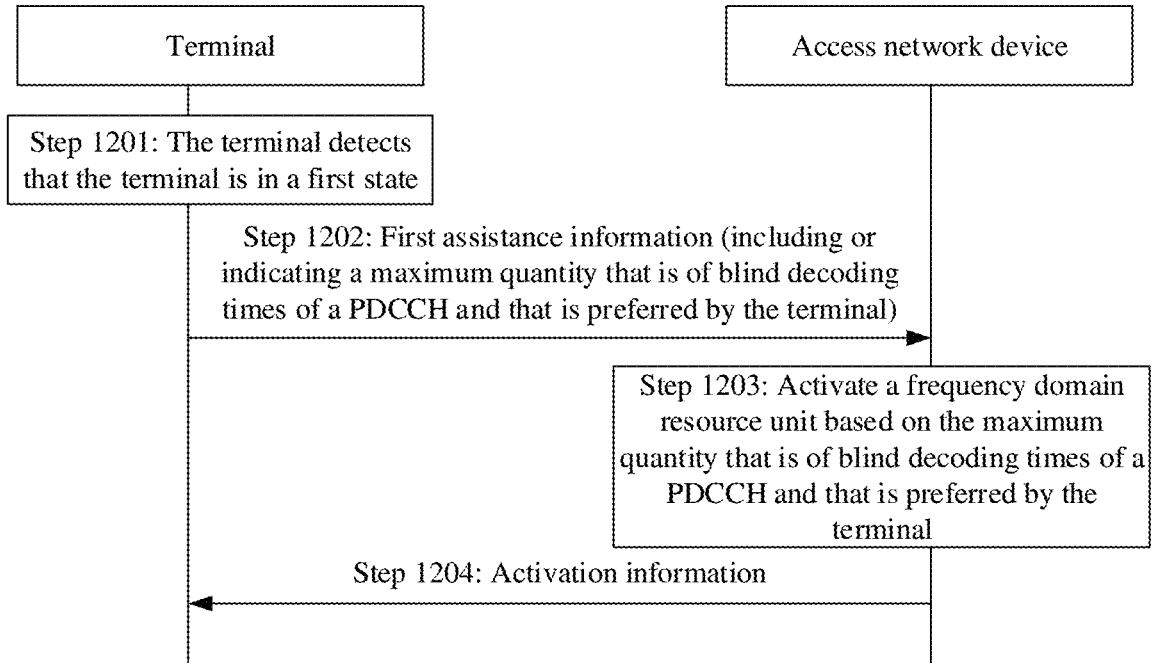
FIG. 12 is a flowchart of another frequency domain resource activation method according to an embodiment of this application.

FIG. 12 is a flowchart of another frequency domain resource activation method according to an embodiment of this application. As shown in FIG. 12, the method may include the following steps.

Step 1201: A terminal detects that the terminal is in a first state.

For descriptions of the first state, refer to the descriptions in FIG. 3. Details are not described again.

Step 1202: The terminal sends first assistance information to an access network device, where the first assistance information includes or indicates a maximum quantity that is of blind decoding times of a PDCCH and that is preferred by the terminal.

The maximum quantity that is of blind decoding times of a PDCCH and that is preferred by the terminal may be used to indicate a maximum quantity, preferred by the terminal, of times of PDCCH blind decoding. A total quantity of blind decoding times of a PDCCH on one or more BWPs that are expected to be activated by the access network device does not exceed the maximum quantity of blind decoding times.

It is assumed that a frequency domain resource unit is a BWP, the terminal requests to activate a downlink (DownLink, DL) BWP and an uplink (UpLink, DL) BWP, and first assistance information is carried in an information element of air interface signaling. In this case, a format of the information element is as follows:

```
RRCSignallingI=SEQUENCE{
...
reducedPdcchBlindDetectNum INTEGER(1..1023) OPTIONAL,
...}
``` reducedPdcchBlindDetectNum represents the maximum quantity that is of blind decoding times of a PDCCH and that is preferred by the terminal, and reducedPdcchBlindDetectNum INTEGER(1 . . . 1023) OPTIONAL represents that the maximum quantity that is of blind decoding times of a PDCCH and that is preferred by the terminal may be any value from 1 to 1023.

Step 1203: The access network device receives the first information, and activates a frequency domain resource unit based on the maximum quantity that is of blind decoding times of a PDCCH and that is preferred by the terminal.

Specifically, that the access network device activates a frequency domain resource unit based on the maximum quantity that is of blind decoding times of a PDCCH and that is preferred by the terminal may include the following: The access network device selects to activate one or more frequency domain resource units, where a total quantity of blind decoding times of a PDCCH carried on the activated frequency domain resource unit is less than or equal to the maximum quantity of blind decoding times preferred by the terminal. If a current frequency domain resource unit configuration cannot meet the foregoing condition, the access network device may reconfigure one or more frequency domain resource units. For example, a quantity of blind decoding times of a PDCCH on any current frequency domain resource unit is greater than the maximum quantity that is of blind decoding times of a PDCCH and that is preferred by the terminal, and the access network device reconfigures a PDCCH search space and/or a control resource set on the one or more frequency domain resource units, so that a total quantity of blind decoding times of a PDCCH on the one or more frequency domain resource units is less than or equal to the maximum quantity of blind decoding times preferred by the terminal.

Step 1204: The access network device sends activation information to the terminal.

For the activation information, refer to the descriptions in FIG. 3. Details are not described again.

It should be noted that the maximum quantity that is of blind decoding times of a PDCCH and that is preferred by the terminal in FIG. 12 may be replaced with a quantity that is of blind decoding times of a PDCCH and that is preferred by the terminal. In other words, the terminal specifies, for the access network device, a total quantity of blind decoding times of a PDCCH carried on an active frequency domain resource unit, so that the total quantity of blind decoding times of the PDCCH carried on the active frequency domain resource unit meets a requirement of the terminal. For example, if the maximum quantity that is of blind decoding times of a PDCCH and that is preferred by the terminal is 10, a total quantity of blind decoding times of a PDCCH carried on the frequency domain resource unit activated by the access network device needs to be 10.

Based on the method shown in FIG. 12, the terminal may provide, to the access network device, the preferred quantity of blind decoding times of a PDCCH, so as to limit the quantity of blind decoding times of the PDCCH on the frequency domain resource unit activated by the access network device. This reduces a quantity of times of PDCCH blind decoding performed by the terminal, so that the terminal reduces power consumption caused by PDCCH blind decoding.

It should be noted that the maximum quantity that is of blind decoding times of a PDCCH and that is preferred by the terminal in FIG. 10 is set to an invalid value 0 to indicate that a quantity of blind decoding times of a PDCCH is not limited, and the network side device may configure or activate the frequency domain resource unit based on capability information of the terminal.

Figure 13:
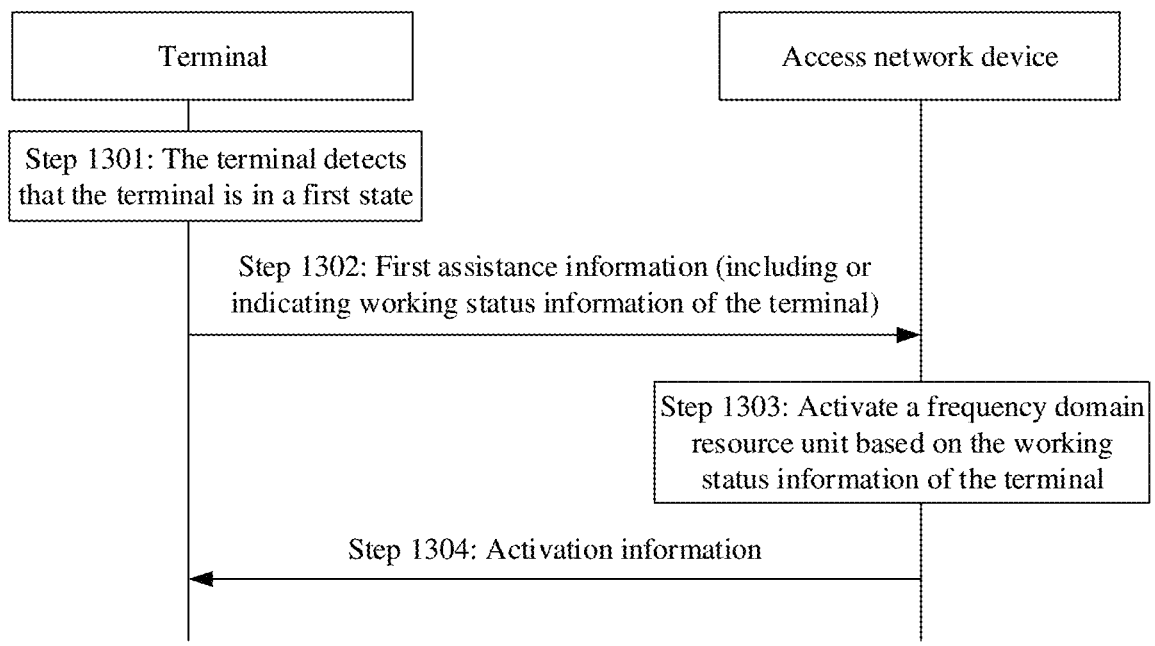
FIG. 13 is a flowchart of another frequency domain resource activation method according to an embodiment of this application.

FIG. 13 is a flowchart of a frequency domain resource activation method according to an embodiment of this application. As shown in FIG. 13, the method may include the following steps.

Step 1301: A terminal detects that the terminal is in a first state.

For descriptions of the first state, refer to the descriptions in FIG. 3. Details are not described again.

Step 1302: The terminal sends first assistance information to an access network device, where the first assistance information includes working status information of the terminal.

The working status information of the terminal may include one or more of battery level information of the terminal, temperature information of the terminal, and signal strength information of the terminal. The working status information of the terminal corresponds to information that assists the access network device in activating a frequency domain resource unit. The information that assists the access network device in activating the frequency domain resource unit may be one or more of the following pieces of information: a maximum bandwidth (or a bandwidth) that is of a frequency domain resource unit and that is preferred by the terminal, a maximum quantity (or a quantity) that is of frequency domain resource units and that is preferred by the terminal, and a maximum total bandwidth (or a total bandwidth) that is of frequency domain resource units and that is preferred by the terminal; or may be indication information of a frequency domain resource unit preferred by the terminal, or a maximum quantity (or a quantity) that is of blind decoding times of a PDCCH and that is preferred by the terminal.

The battery level information may be a battery level value of the terminal, or may be a battery level grade corresponding to a current battery level of the terminal. A higher battery level grade indicates more sufficient power of the terminal. The temperature information may be a temperature value of the terminal, or may be a temperature level corresponding to a current temperature of the terminal. A higher temperature level indicates a higher temperature of the terminal. The signal strength information may be a signal strength value of the terminal, or may be a signal strength level corresponding to a current signal strength of the terminal. A higher signal strength level indicates a better signal of the terminal.

For example, it is assumed that the first assistance information includes the battery level grade of the terminal and the temperature level of the terminal, and first information including the first assistance information is carried in an information element of air interface signaling. In this case, a format of the information element is as follows:

```
RRCSignallingI=SEQUENCE{
...
overHeatingLevel ENUMERATED(Level1, Level2, Level3) OPTIONAL,
batteryLevel ENUMERATED(Level 1, Level2, Level3) OPTIONAL,
...}
``` overHeatingLevel represents an overheating level of the terminal, and a higher level indicates more severe heating; batteryLevel represents the battery level grade of the terminal, and a lower grade indicates a lower battery level.

Step 1303: The access network device receives the first information, and activates the frequency domain resource unit based on the working status information of the terminal.

Specifically, that the access network device activates the frequency domain resource unit based on the working status information of the terminal may include the following:

The access network device determines, based on a correspondence between the working status information of the terminal and the information that assists the access network device in activating the frequency domain resource unit, the information that corresponds to the working status information and that assists the access network device in activating the frequency domain resource unit, and activates the frequency domain resource unit based on the information that assists the access network device in activating the frequency domain resource unit. For a manner in which the access network device activates the frequency domain resource unit based on the information that assists the access network device in activating the frequency domain resource unit, refer to the descriptions in FIG. 4 to FIG. 12. Details are not described again.

Table 1 below is used as an example. Table 1 shows a correspondence between an overheating level, and a maximum bandwidth that is of a BWP and that is preferred by the terminal and a maximum quantity that is of BWPs and that is preferred by the terminal. When receiving information that carries an overheating level Level1, the access network device may determine, based on Table 1, that the maximum bandwidth that is of a BWP and that is preferred by the terminal is 100 MHz and the maximum quantity that is of BWPs and that is preferred by the terminal is 2, and select, in the manner shown in FIG. 7, a to-be-activated BWP based on the maximum bandwidth 100 MHz that is of a BWP and that is preferred by the terminal and the maximum quantity 2 that is of BWPs and that is preferred by the terminal.

TABLE 1

| overHeatingLevel | Maximum bandwidth that is of a BWP and that is preferred by the terminal | Maximum quantity that is of BWPs and that is preferred by the terminal |
|---|---|---|
| Level1 | 100 MHz | 2 |
| Level2 | 50 MHz | 2 |
| Level3 | 5 MHz | 1 |

Table 2 below is used as an example. Table 2 shows a correspondence between a battery level grade, and a maximum bandwidth that is of a BWP and that is preferred by the terminal and a total quantity that is of BWPs and that is preferred by the terminal. When receiving information that carries a battery level grade Level1, the access network device may determine, based on Table 2, that the maximum bandwidth that is of a BWP and that is preferred by the terminal is 5 MHz and the maximum quantity that is of BWPs and that is preferred by the terminal is 1, and select, in the manner shown in FIG. 7, a to-be-activated BWP based on the maximum bandwidth 5 MHz that is of a BWP and that is preferred by the terminal and the maximum quantity 1 that is of BWPs and that is preferred by the terminal.

TABLE 2

| batteryLevel | Maximum bandwidth that is of a BWP and that is preferred by the terminal | Maximum quantity that is of BWPs and that is preferred by the terminal |
|---|---|---|
| Level1 | 5 MHz | 1 |
| Level2 | 50 MHz | 2 |
| Level3 | 100 MHz | 2 |

Step 1304: The access network device sends activation information to the terminal.

For the activation information, refer to the descriptions in FIG. 3. Details are not described again.

Based on the method shown in FIG. 13, the terminal reports the battery level information and overheating information to the access network device based on a battery level and a heating status, and the access network device determines, based on a correspondence between the battery level information and the overheating information and the information that assists the access network device in activating the frequency domain resource unit, the information that assists the access network device in activating the frequency domain resource unit, selects to activate a small-bandwidth frequency domain resource unit based on the determined information, and reduces a quantity of simultaneously activated frequency domain resource units. In other words, the terminal directly reports the battery level information or the overheating information, and does not need to perform additional processing. Implementation is simple.

The solutions provided in the embodiments of this application are mainly described above from a perspective of interaction between nodes. It can be understood that, to implement the foregoing functions, the nodes, for example, a first device and a second device, include corresponding hardware structures and/or software modules for performing the functions. A person skilled in the art should easily be aware that, in combination with the examples described in the embodiments disclosed in this specification, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional module division may be performed on the first device and the second device based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, the module division is an example, and is merely logical function division. In actual implementation, other division manner may be used.

Figure 14:
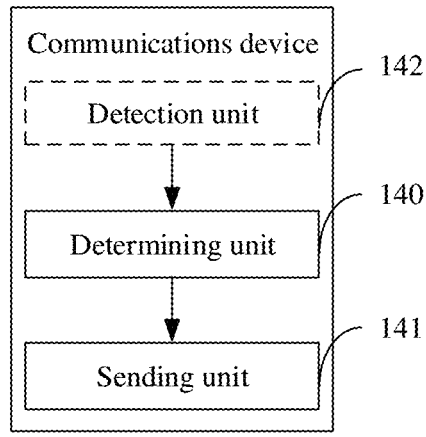
FIG. 14 is a schematic composition diagram of another communications device according to an embodiment of this application.

FIG. 14 is a structural diagram of a communications device. The communications device may be a terminal, a chip in a terminal, or a system-on-a-chip. The communications device may be configured to perform the functions of the terminal in the foregoing embodiments.

In an implementation, the communications device shown in FIG. 14 includes a determining unit 140 and a sending unit 141.

The determining unit 140 is configured to support the communications device to perform step 301.

The sending unit 141 is configured to support the communications device to perform step 302.

Further, the communications device shown in FIG. 14 further includes a detection unit 152;

the detection unit 142 is configured to detect that a battery level of the terminal is greater than a preset battery level threshold and a temperature of the terminal is less than a preset temperature threshold; and the sending unit 141 is further configured to send, to an access network device, second information that includes information used to request the access network device to configure or activate a frequency domain resource unit based on capability information of the terminal, or includes second assistance information of the terminal.

It should be noted that all related content of the steps in the foregoing method embodiments may be cited in function descriptions of the corresponding functional modules. Details are not described herein again. The communications device provided in this embodiment of this application is configured to perform the function of the terminal in the foregoing frequency domain resource activation method, and therefore can achieve a same effect as the foregoing frequency domain resource activation method.

In another possible implementation, the communications device shown in FIG. 14 may include a processing module and a communications module. The processing module is configured to control and manage an action of the communications device. For example, the processing module is configured to support the communications device to perform other processes of a technology described in this specification. The communications module is configured to support the communications device to communicate with another network entity, for example, communicate with a functional module or a network entity shown in FIG. 1. Further, the communications device may further include a storage module, configured to store program code and data of the communications device.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications device shown in FIG. 14 may be the communications device shown in FIG. 2.

Figure 15:
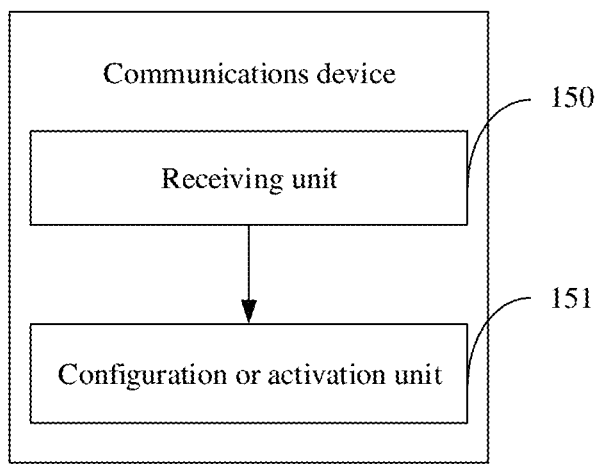
FIG. 15 is a schematic composition diagram of still another communications device according to an embodiment of this application.

FIG. 15 is a structural diagram of a communications device. The communications device may be an access network device, a chip in an access network device, or a system-on-a-chip. The communications device may be configured to perform functions of the access network device in the foregoing embodiments. In an implementation, the communications device shown in FIG. 15 includes a receiving unit 150 and a configuration or an activation unit 151.

The receiving unit 150 is configured to support the communications device to perform step 302.

The configuration or activation unit 151 is configured to support the communications device to perform step 303.

In another possible implementation, the communications device shown in FIG. 15 includes a processing module and a communications module. The processing module is configured to control and manage an action of the communications device. For example, the processing module is configured to support the communications device to perform other processes of a technology described in the specification. The communications module is configured to support the communications device to communicate with another network entity, for example, communicate with a functional module or a network entity shown in FIG. 1. The communications device may further include a storage module, configured to store program code and data of the communications device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications device in this embodiment of this application may be the communications device shown in FIG. 2.

Figure 16:
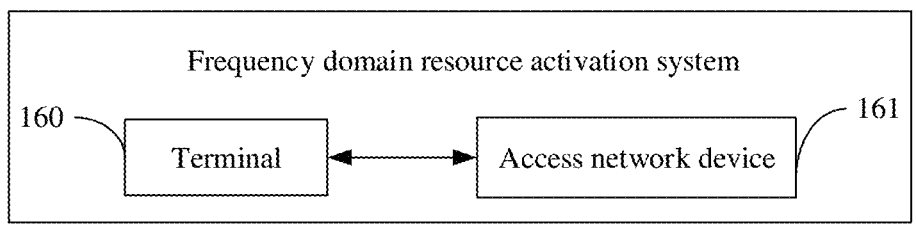
FIG. 16 is a schematic composition diagram of a frequency domain resource activation system according to an embodiment of this application.

FIG. 16 is a structural diagram of a frequency domain resource activation system according to an embodiment of this application. As shown in FIG. 16, the frequency domain resource activation system may include a terminal 160 and an access network device 161.

The terminal 160 may be the communications device shown in FIG. 14, and is configured to perform functions of the terminal in the foregoing method embodiments. The access network device 161 may be the communications device shown in FIG. 15, and is configured to perform functions of the access network device in the foregoing method embodiments. Details are not described again.

It should be noted that all related content of the steps in the foregoing method embodiments can be cited in function descriptions of the corresponding functional entities. Details are not described herein again. For example, the functional entities in the frequency domain resource activation system provided in this embodiment of this application can interact with each other and perform following processes: The terminal 160 determines first information and sends the first information to the access network device 161, and the access network device 161 receives the first information and configures or activates a frequency domain resource unit based on the first information. The first information includes information used to request the access network device 161 to configure or activate the frequency domain resource unit of the terminal 160, or includes first assistance information of the frequency domain resource unit of the terminal 160. In this way, the terminal actively requests the access network device to activate the frequency domain resource unit, so that the access network device activates the frequency domain resource unit based on the information reported by the terminal. In other words, when activating the frequency domain resource unit, the access network device needs to perform activation with reference to the information uploaded by the terminal. This can avoid problems of low battery and overheating of the terminal that are caused when the access network device autonomously determines the to-be-activated frequency domain resource unit.

The foregoing descriptions about implementations allow a person skilled in the art to understand that, for the purpose of convenient and brief description, division into the foregoing functional modules is taken as an example for illustration. In actual application, the foregoing functions can be allocated to different functional modules and implemented according to a requirement. To be specific, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. A part or all of the units may be selected based on actual requirements to achieve the objective of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A frequency domain resource activation method, wherein the method comprises:
    determining, by a terminal, a state of the terminal, wherein the state of the terminal is associated with a temperature of the terminal;
    determining, by the terminal, and according to the state of the terminal, first information that is different than, and based on, the determined state of the terminal, wherein the first information comprises first assistance information of a frequency domain resource unit of the terminal, and wherein the frequency domain resource unit is a bandwidth part (BWP), and wherein the first information further comprises an overheating level; and
    sending, by the terminal, the first information to an access network device, wherein sending the first information to the access network device causes the access network device to determine, based on the overheating level and a table of correspondence between an overheating level, a maximum bandwidth that is of a BWP and that is preferred by the terminal and a maximum quantity that is of BWPs and that is preferred by the terminal, a maximum bandwidth that is of a BWP and that is preferred by the terminal and a maximum quantity that is of BWPs and that is preferred by the terminal, and further causes the access network device to select a to-be-activated BWP based on a determined maximum bandwidth of a BWP and a determined maximum quantity of BWPs.

2. The method according to claim 1, wherein the first assistance information comprises or indicates at least one of:
    a bandwidth or maximum bandwidth that is of a frequency domain resource unit and that is preferred by the terminal;
    a quantity or maximum quantity that is of frequency domain resource units and that is preferred by the terminal; or
    a total bandwidth or maximum total bandwidth that is of frequency domain resource units and that is preferred by the terminal.

3. The method according to claim 1, wherein the method further comprises:
    detecting, by the terminal, at least the temperature of the terminal being less than a preset temperature threshold; and
    sending, by the terminal, second information to the access network device, wherein the second information comprises at least one of information requesting that the access network device configure or activate the frequency domain resource unit based on capability information of the terminal, or second assistance information of the terminal.

4. The method according to claim 3, wherein the second assistance information indicates to the access network device to configure or activate the frequency domain resource unit based on the capability information of the terminal, and wherein the second assistance information comprises current working status information of the terminal or indicates a working status of the terminal.

5. A communications device, comprising:
one or more processors; and
one or more memories coupled to the one or more processors, wherein the one or more memories have computer program code stored thereon for execution by the one or more processors, the computer program code comprising instructions for:
determining a state of the communications device, wherein the state of the communications device is associated with a temperature of the communications device;
determining first information according to state of the communications device, wherein the first information is different than, and based on, the determined state of the communications device, wherein the first information comprises first assistance information of a frequency domain resource unit of the communications device, wherein the frequency domain resource unit is a bandwidth part (BWP), and wherein the first information further comprises an overheating level; and
sending the first information to an access network device, wherein sending the first information to the access network device causes the access network device to determine, based on the overheating level and a table of correspondence between an overheating level, a maximum bandwidth that is of a BWP and that is preferred by the communications device and a maximum quantity that is of BWPs and that is preferred by the communications device, a maximum bandwidth that is of a BWP and that is preferred by the communications device and a maximum quantity that is of BWPs and that is preferred by the communications device, and further causes the access network device to select a to-be-activated BWP based on a determined maximum bandwidth of a BWP and a determined maximum quantity of BWPs.

6. The communications device according to claim 5, wherein the first assistance information comprises or indicates at least one of:
a bandwidth or maximum bandwidth that is of a frequency domain resource unit and that is preferred by the communications device;
a quantity or maximum quantity that is of frequency domain resource units and that is preferred by the communications device; or
a total bandwidth or maximum total bandwidth that is of frequency domain resource units and that is preferred by the communications device.

7. The communications device according to claim 5, wherein the first assistance information comprises or indicates indication information of a frequency domain resource unit preferred by the communications device.

8. The communications device according to claim 5, wherein the first assistance information comprises or indicates a quantity or maximum quantity of blind decoding times that is of a physical downlink control channel (PDCCH) and that is preferred by the communications device.

9. The communications device according to claim 5, wherein the first assistance information comprises or indicates working status information of the communications device.

10. The communications device according to claim 9, wherein the working status information of the communications device comprises at least temperature information of the communications device.

11. The communications device according claim 5, wherein the frequency domain resource unit belongs to at least one of one carrier or one cell.

12. The communications device according to claim 5, wherein the computer program code further comprises instructions for:
detecting the temperature of the communications device is less than a preset temperature threshold; and
sending second information to the access network device, wherein the second information comprises at least one of information requesting that the access network device configure or activate the frequency domain resource unit based on capability information of the communications device, or second assistance information of the communications device.

13. The communications device according to claim 12, wherein the second assistance information indicates to the access network device to configure or activate the frequency domain resource unit based on the capability information of the communications device, and wherein the second assistance information comprises current working status information of the communications device or indicates a working status of the communications device.

14. A communications device, comprising:
one or more processors; and
one or more memories coupled to the one or more processors, wherein the one or more memories have computer program code stored thereon for execution by the one or more processors, the computer program code comprising instructions for:
receiving first information sent by a terminal, wherein the receiving the first information indicates that the terminal has determined a state of the terminal, wherein the first information is associated with the state of the terminal, wherein the state of the communications device is associated with a temperature of the communications device, wherein the first information is different than, and based on, the determined state of the terminal, wherein the first information comprises first assistance information of a frequency domain resource unit of the terminal, wherein the frequency domain resource unit is a bandwidth part (BWP), and wherein the first information further comprises an overheating level;
determining, based on the overheating level and a table of correspondence between an overheating level, a maximum bandwidth that is of a BWP and that is preferred by the terminal and a maximum quantity that is of BWPs and that is preferred by the terminal, a maximum bandwidth that is of a BWP and that is preferred by the terminal and a maximum quantity that is of BWPs and that is preferred by the terminal; and
configuring or activating the frequency domain resource unit based on the first information by at least selecting a to-be-activated BWP based on a determined maximum bandwidth of a BWP and a determined maximum quantity of BWPs.

15. The communications device according to claim 14, wherein the first assistance information comprises at least one of:
- a bandwidth or maximum bandwidth that is of a frequency domain resource unit and that is preferred by the terminal;
- a quantity or maximum quantity that is of frequency domain resource units and that is preferred by the terminal; or
- a total bandwidth or maximum total bandwidth that is of frequency domain resource units and that is preferred by the terminal.

16. The communications device according to claim 14, wherein the computer program code further comprises instructions for:
- receiving second information sent by the terminal, wherein the second information comprises at least one of information requests that the communications device configure or activate the frequency domain resource unit based on capability information of the terminal, or second assistance information of the terminal.

17. The communications device according to claim 16, wherein the second assistance information indicates to the communications device to configure or activate the frequency domain resource unit based on the capability information of the terminal, and wherein the second assistance information comprises current working status information of the terminal or indicates a working status of the terminal.

* * * * *